(12) United States Patent
Koyama et al.

(10) Patent No.: US 9,150,421 B2
(45) Date of Patent: Oct. 6, 2015

(54) SILANE SURFACE-TREATED METAL OXIDE FINE PARTICLES AND PRODUCTION METHOD FOR SAME

(75) Inventors: Yoshinari Koyama, Sodegaura (JP); Motoko Asada, Sodegaura (JP); Tomoki Furukawa, Sodegaura (JP); Natsumi Tsuihiji, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 667 days.

(21) Appl. No.: 13/520,907

(22) PCT Filed: Jan. 19, 2011

(86) PCT No.: PCT/JP2011/050893
§ 371 (c)(1),
(2), (4) Date: Aug. 24, 2012

(87) PCT Pub. No.: WO2011/090084
PCT Pub. Date: Jul. 28, 2011

(65) Prior Publication Data
US 2012/0316266 A1    Dec. 13, 2012

(30) Foreign Application Priority Data

Jan. 19, 2010 (JP) .................................. 2010-008903

(51) Int. Cl.
| | |
|---|---|
| C09C 1/36 | (2006.01) |
| C08K 3/00 | (2006.01) |
| C04B 14/04 | (2006.01) |
| C08K 5/00 | (2006.01) |
| C01B 33/12 | (2006.01) |
| B01J 13/00 | (2006.01) |
| B82Y 30/00 | (2011.01) |
| C01B 13/36 | (2006.01) |
| C01G 23/053 | (2006.01) |
| C09C 1/00 | (2006.01) |
| C09C 3/06 | (2006.01) |
| C09C 3/12 | (2006.01) |
| C09C 1/30 | (2006.01) |

(52) U.S. Cl.
CPC ............ *C01B 33/12* (2013.01); *B01J 13/0047* (2013.01); *B82Y 30/00* (2013.01); *C01B 13/363* (2013.01); *C01G 23/053* (2013.01); *C09C 1/00* (2013.01); *C09C 1/0081* (2013.01); *C09C 1/30* (2013.01); *C09C 1/36* (2013.01); *C09C 1/3661* (2013.01); *C09C 3/063* (2013.01); *C09C 3/12* (2013.01); *C01P 2004/64* (2013.01); *C01P 2004/84* (2013.01); *C01P 2006/22* (2013.01); *Y10T 428/2982* (2015.01)

(58) Field of Classification Search
CPC ....................................................... C08L 63/00
USPC .......... 523/458; 106/450, 401, 436, 482, 491; 524/730; 428/402
See application file for complete search history.

(56) References Cited

U.S. PATENT DOCUMENTS

| | | | |
|---|---|---|---|
| 2005/0209346 A1* | 9/2005 | Koyama et al. ................ | 516/90 |
| 2008/0276835 A1 | 11/2008 | Koyama et al. | |
| 2009/0308282 A1 | 12/2009 | Koyama et al. | |
| 2010/0239872 A1 | 9/2010 | Koyama et al. | |
| 2014/0199554 A1* | 7/2014 | Koyama et al. ............... | 428/447 |

FOREIGN PATENT DOCUMENTS

| | | |
|---|---|---|
| JP | A-2000-281344 | 10/2000 |
| JP | A-2000-281973 | 10/2000 |
| JP | A-2002-363442 | 12/2002 |
| JP | A-2005-200294 | 7/2005 |
| WO | WO 2007/018176 A1 | 2/2007 |
| WO | WO 2008/007708 A1 | 1/2008 |
| WO | WO 2009/044878 A1 | 4/2009 |
| WO | WO 2010/008050 A1 | 1/2010 |

OTHER PUBLICATIONS

Written Opinion of the International Searching Authority issued in International Application No. PCT/JP2011/050893 mailed May 10, 2011.
International Search Report issued in International Application No. PCT/JP2011/050893 mailed May 10, 2011.

* cited by examiner

*Primary Examiner* — Megan McCulley
(74) *Attorney, Agent, or Firm* — Oliff PLC

(57) ABSTRACT

There is provided a colloidal particle of an oxide of at least one metal selected from the group consisting of Ti, Fe, Zr, Sn, Ta, Nb, Y, Mo, W, Pb, In, Bi, and Sr, which is capable of being dispersed in a hydrophobic organic solvent, and a hydrophilic organic solvent dispersed sol thereof or a sol thereof dispersed in a hydrophobic organic solvent having a solubility of water of 0.05 to 12% by mass, and further, a fine powder of a metal oxide colloidal particle capable of being redispersed in various organic solvents. A silane treated modified metal oxide colloidal particle on the surface of which an amine compound and 1 to 4 silyl group(s) per 1 $nm^2$ of the surface area are bonded, and which is produced by coating a metal oxide colloidal particle as a core with a complex oxide colloidal particle.

19 Claims, No Drawings

SILANE SURFACE-TREATED METAL OXIDE FINE PARTICLES AND PRODUCTION METHOD FOR SAME

TECHNICAL FIELD

The present invention relates to: a silane treated modified metal oxide colloidal particle characterized by being produced by bonding to the particle surface of a modified metal oxide colloidal particle, 1 to 4 silyl group(s) per 1 nm$^2$ of the surface area of the particle surface of the modified metal oxide colloidal particle which is produced by coating an outer surface of a metal oxide colloidal particle as the core with a complex oxide colloidal particle, the modified metal oxide colloidal particle being a modified metal oxide colloidal particle (C) produced by coating an outer surface of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core with a silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of $M/(SnO_2+SiO_2)$ (where M is an amine compound) of 0.001 to 0.08, the modified metal oxide colloidal particle (C) having the mass ratio (B)/(A) of the complex oxide colloidal particle (B) relative to the metal oxide colloidal particle (A) being 0.05 to 0.50; a hydrophilic organic solvent dispersed sol thereof or a hydrophobic organic solvent dispersed sol thereof in which the hydrophobic organic solvent has a solubility of water of 0.05 to 12% by mass; and an efficient production method of these sols.

The hydrophilic organic solvent dispersed sol or the hydrophobic organic solvent dispersed sol in which the hydrophobic organic solvent has a solubility of water of 0.05 to 12% by mass of the silane treated modified metal oxide colloidal particle of the present invention is used in various applications such as a transparent ultraviolet ray absorbing material applied to resin, plastic, glass, and the like, a transparent heat ray absorbing material, a high refractive index hard coating agent, an anti-reflective agent, and a sealing material.

BACKGROUND ART

With respect to a metal oxide sol containing a hydrophobic organic solvent as the dispersion medium, for example, known is a production method of an organic solvent dispersed inorganic oxide sol in which inorganic oxide fine particles in which a $C_{3-12}$ primary alkoxy group is bonded to a silicon atom on the surface of the inorganic oxide fine particle, are stably dispersed in an organic solvent such as methyl ethyl ketone (see Patent Document 1).

Furthermore, disclosed are a stable sol containing: a structure in which a colloidal particle of stannic oxide and a colloidal particle of zirconium oxide are bonded with each other in a $ZrO_2/SnO_2$ ratio based on the weight of these oxides of 0.02 to 1.0; and a modified stannic oxide-zirconium oxide complex colloidal particle having a particle diameter of 4.5 to 60 nm which is formed by coating the surface of a stannic oxide-zirconium oxide complex colloidal particle having a particle diameter of 4 to 50 nm as the core with a tungsten oxide-stannic oxide-silicon dioxide complex colloidal particle having a $WO_3/SnO_2$ mass ratio of 0.1 to 100, an $SiO_2/SnO_2$ mass ratio of 0.1 to 100, and a particle diameter of 2 to 7 nm, and containing 2 to 50% by mass of all the metal oxides, and a production method for the same (see Patent Document 2).

RELATED-ART DOCUMENTS

Patent Documents

Patent Document 1: Japanese Patent Application Publication No. 2005-200294 (JP 2005-200294 A)
Patent Document 2: Japanese Patent Application Publication No. 2000-281344 (JP 2000-281344 A)
Patent Document 3: Japanese Patent Application Publication No. 2000-281973 (JP 2000-281973 A)

SUMMARY OF THE INVENTION

Problem to be Solved by the Invention

When a stable sol containing a modified stannic oxide-zirconium oxide complex colloidal particle having a particle diameter of 4.5 to 60 nm formed by coating with a tungsten oxide-stannic oxide-silicon dioxide complex colloidal particle and containing 2 to 50% by mass of all the metal oxides, which is described in Patent Document 2, uses as the dispersion medium, an organic solvent having high hydrophobicity such as methyl ethyl ketone and xylene in particular, the stable sol is unsatisfactory for dispersing the above metal oxide colloidal particle in a state close to the primary particle diameter without causing agglomeration thereof.

A coating composition containing an organic silicon compound and a modified stannic oxide-zirconium oxide complex colloidal particle produced by coating at least a part of the surface of a stannic oxide-zirconium oxide complex colloid with a stannic oxide-tungsten oxide-silicon oxide complex colloidal particle in Patent Document 3 reacts with the organic silicon compound onto the surface of the above colloidal particle only to an insufficient degree; and the coating composition cannot be dispersed in a stable hydrophobic organic solvent with high concentration.

It is an object of the present invention to provide a colloidal particle of an oxide of at least one metal selected from the group consisting of Ti, Fe, Zr, Sn, Ta, Nb, Y, Mo, W, Pb, In, Bi, and Sr having a primary particle diameter of 5 to 60 nm capable of being dispersed in a hydrophobic organic solvent having a solubility of water of 0.05 to 12% by mass, and a hydrophilic organic solvent dispersed sol thereof or a hydrophobic organic solvent dispersed sol thereof in which the hydrophobic organic solvent has a solubility of water of 0.05 to 12% by mass, and further, it is an object of the present invention to provide a fine powder of a metal oxide colloidal particle capable of being redispersed in various organic solvents.

Means for Solving the Problem

The present invention relates to, as a first aspect, a silane treated modified metal oxide colloidal particle characterized by being produced by bonding to the particle surface of a modified metal oxide colloidal particle, 1 to 4 silyl group(s) per 1 nm$^2$ of the surface area of the particle surface of the modified metal oxide colloidal particle which is produced by coating an outer surface of a metal oxide colloidal particle as the core with a complex oxide colloidal particle, the modified metal oxide colloidal particle being a modified metal oxide colloidal particle (C) produced by coating an outer surface of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core with a silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of M/(SnO$_2$+SiO$_2$) (where M is an amine compound) of 0.001 to 0.08, the modified metal oxide colloidal particle (C) having the mass ratio (B)/(A) of the complex oxide colloidal particle (B) relative to the metal oxide colloidal particle (A) being 0.05 to 0.50, as a second aspect, the silane treated modified metal oxide colloidal particle according to the first aspect, in which the silyl group is a group of Formula (I) below:

—Si(R$^1$)$_a$(X)$_{3-a}$  Formula (I)

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a C$_{1-4}$ alkoxy group; and a is an integer of 0 to 3), as a third aspect, the silane treated modified metal oxide colloidal particle according to the first aspect, in which the amine compound is at least one of compound selected from the group consisting of a primary amine, a secondary amine, and a tertiary amine, as a fourth aspect, a hydrophilic organic solvent dispersed sol of the silane treated modified metal oxide colloidal particle according to any one of the first aspect to the third aspect, as a fifth aspect, the hydrophilic organic solvent dispersed sol of the silane treated modified metal oxide colloidal particle according to the fourth aspect, in which the hydrophilic organic solvent is at least one selected from the group consisting of methyl alcohol, ethyl alcohol, isopropyl alcohol, dimethylformamide, ethylcellosolve, butylcellosolve, ethylene glycol, and propylene glycol monomethyl ether, as a sixth aspect, a hydrophobic organic solvent dispersed sol in which the hydrophobic organic solvent has a solubility of water of 0.05 to 12% by mass containing the silane treated modified metal oxide colloidal particle according to any one of the first aspect to the third aspect, as a seventh aspect, the hydrophobic organic solvent dispersed sol according to the sixth aspect, in which the hydrophobic organic solvent having a solubility of water of 0.05 to 12% by mass is at least one selected from the group consisting of methyl ethyl ketone, methyl isobutyl ketone, cyclohexanone, hexane, ethyl acetate, butyl acetate, methyl methacrylate, diisopropyl ether, and toluene, as an eighth aspect, a production method of the hydrophilic organic solvent dispersed sol of the silane treated modified metal oxide colloidal particle according to claim 4 including processes (a), (b), (c), (d), (e), and (f) below:

a process (a): preparing an aqueous solution containing an alkali stannate and an alkali silicate in such an amounts that the mass ratio of silicon dioxide/stannic oxide becomes 0.1 to 5; removing cations existing in the aqueous solution to prepare an aqueous sol of a silicon dioxide-stannic oxide complex colloidal particle having a primary particle diameter of 1 to 4 nm; and adding to the aqueous sol, an amine compound in an amount so that the molar ratio of M/(SnO$_2$+SiO$_2$) (where M is an amine compound) becomes 0.1 to 1.0 to obtain an aqueous sol of a silicon dioxide-stannic oxide complex oxide colloidal particle (B') having a mass ratio of silicon dioxide/stannic oxide of 0.1 to 5.0, having a primary particle diameter of 1 to 4 nm, and stabilized by the amine compound existing in a molar ratio of M/(SnO$_2$+SiO$_2$) (where M is an amine compound) of 0.1 to 1.0, a process (b): mixing an aqueous sol of the colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm and the aqueous sol obtained in the process (a) in such amounts that the mass ratio (B')/(A) of the silicon dioxide-stannic oxide complex oxide colloidal particle (B') relative to the metal oxide colloidal particle (A) becomes 0.05 to 0.50 to obtain an aqueous sol of a modified metal oxide colloidal particle (C') produced by coating the metal oxide colloidal particle (A) with the silicon dioxide-stannic oxide complex oxide colloidal particle (B'), a process (c): cation-exchanging the aqueous sol of the modified metal oxide colloidal particle (C') obtained in the process (b) to remove the amine compound added in the process (a), a process (d): adding to the aqueous sol obtained in the process (c), an amine compound in such an amount that the molar ratio of M/(SnO$_2$+SiO$_2$) (where M is an amine compound) of the amine compound relative to the silicon dioxide-stannic oxide complex oxide colloidal particle (B') becomes 0.001 to 0.08 to obtain an aqueous sol of the modified metal oxide colloidal particle (C) produced by coating an outer surface of the oxide colloidal particle (A) as the core with the silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of M/(SnO$_2$+SiO$_2$) (where M is an mine compound) of 0.001 to 0.08, the modified metal oxide colloidal particle (C) having the mass ratio (B)/(A) of the silicon dioxide-stannic oxide complex oxide colloidal particle (B) relative to the metal oxide colloidal particle (A) being 0.05 to 0.50, a process (e): exchanging a dispersion medium of the aqueous sol obtained in the process (d) for a hydrophilic organic solvent, and a process (f): adding to the hydrophilic organic solvent dispersed sol obtained in the process (e), at least one of compound selected from the group consisting of an organic silicon compound of General Formula (II) below:

Si(R)$_a$(X)$_{4-a}$  General Formula (II)

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a C$_{1-4}$ alkoxy group; and a is an integer of 0 to 3), a hydrolysis product thereof, and an organic silicon compound of General Formula (III) below:

(R$^1$$_3$Si)$_2$NH  General Formula (III)

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group) so that the mass ratio of the organic silicon compound relative to the modified metal oxide colloidal particle (C) becomes 0.01 to 0.50 to bond a silyl group of General Formula (I):

—Si(R$^1$)$_a$(X)$_{3-a}$  General Formula (I)

(where $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a $C_{1-4}$ alkoxy group; and a is an integer of 0 to 3) to the surface of the modified metal oxide colloidal particle (C), as a ninth aspect, the production method of the hydrophilic organic solvent dispersed sol of the silane treated modified metal oxide colloidal particle according to the eighth aspect, in which at least one of compound selected from the group consisting of a primary amine, a secondary amine, and a tertiary amine is used as the amine compound, as a tenth aspect, the production method of the hydrophilic organic solvent dispersed sol of the silane treated modified metal oxide colloidal particle according to the eighth aspect or the ninth aspect, in which at least one selected from the group consisting of methyl alcohol, ethyl alcohol, isopropyl alcohol, dimethylformamide, ethylcellosolve, butylcellosolve, ethylene glycol, and propylene glycol monomethyl ether is used as the hydrophilic organic solvent, as an eleventh aspect, a production method of the hydrophobic organic solvent dispersed sol in which the hydrophobic organic solvent has a solubility of water of 0.05 to 12% by mass containing the silane treated modified metal oxide colloidal particle according to the sixth aspect or the seventh aspect, the production method including processes (a), (b), (c), (d), (e), (f), and (g) below:

a process (a): preparing an aqueous solution containing an alkali stannate and an alkali silicate in such amounts that the mass ratio of silicon dioxide/stannic oxide becomes 0.1 to 5; removing cations existing in the aqueous solution to prepare an aqueous sol of a silicon dioxide-stannic oxide complex colloidal particle having a primary particle diameter of 1 to 4 nm; and adding to the aqueous sol, an amine compound in such an amount that the molar ratio of M/(SnO$_2$+SiO$_2$) (where M is an amine compound) becomes 0.1 to 1.0 to obtain an aqueous sol of a silicon dioxide-stannic oxide complex oxide colloidal particle (B') having a mass ratio of silicon dioxide/stannic oxide of 0.1 to 5.0, having a primary particle diameter of 1 to 4 nm, and stabilized by an amine compound existing in a molar ratio of M/(SnO$_2$+SiO$_2$) (where M is an amine compound) of 0.1 to 1.0, a process (b): mixing an aqueous sol of the colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm and the aqueous sol obtained in the process (a) in such amounts that the mass ratio (B')/(A) of the silicon dioxide-stannic oxide complex oxide colloidal particle (B') relative to the metal oxide colloidal particle (A) becomes 0.05 to 0.50 to obtain an aqueous sol of a modified metal oxide colloidal particle (C') produced by coating the metal oxide colloidal particle (A) with the silicon dioxide-stannic oxide complex oxide colloidal particle (B'), a process (c): cation-exchanging the aqueous sol of the modified metal oxide colloidal particle (C') obtained in the process (b) to remove the amine compound added in the process (a), a process (d): adding to the aqueous sol obtained in the process (c), an amine compound in such an amount that M/(SnO$_2$+SiO$_2$) (where M is an amine compound) as the molar ratio of the amine compound relative to the silicon dioxide-stannic oxide complex oxide colloidal particle (B') becomes 0.001 to 0.08 to obtain an aqueous sol of the modified metal oxide colloidal particle (C) produced by coating an outer surface of the oxide colloidal particle (A) as the core with the silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of M/(SnO$_2$+SiO$_2$) (where M is an amine compound) of 0.001 to 0.08, the modified metal oxide colloidal particle (C) having the mass ratio (B)/(A) of the silicon dioxide-stannic oxide complex oxide colloidal particle (B) relative to the metal oxide colloidal particle (A) being 0.05 to 0.50, a process (e): exchanging a dispersion medium of the aqueous sol obtained in the process (d) for a hydrophilic organic solvent, a process (f): adding to the hydrophilic organic solvent dispersed sol obtained in the process (e), at least one of compound selected from the group consisting of an organic silicon compound of General Formula (II) below:

$$Si(R^1)_a(X)_{4-a}  \quad\quad\quad \text{General Formula (II)}$$

(where $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a $C_{1-4}$ alkoxy group; and a is an integer of 0 to 3), a hydrolysis product thereof, and an organic silicon compound of General Formula (III) below:

$$(R^1{}_3Si)_2NH  \quad\quad\quad \text{General Formula (III)}$$

(where $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group) so that the mass ratio of the organic silicon compound relative to the modified metal oxide colloidal particle (C) becomes 0.01 to 0.50 to bond a silyl group of General Formula (I):

$$-Si(R^1)_a(X)_{3-a}  \quad\quad\quad \text{General Formula (I)}$$

(where $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a $C_{1-4}$ alkoxy group; and a is an integer of 0 to 3) to the surface of the modified metal oxide colloidal particle (C), and a process (g): exchanging a dispersion medium of the hydrophilic solvent dispersed sol obtained in the process (f) for a hydrophobic organic solvent having a solubility of water of 0.05 to 12% by mass, as a twelfth aspect, the production method of the hydrophobic organic solvent dispersed sol according to the eleventh aspect, in which at least one selected from the group consisting of a primary amine, a secondary amine, and a tertiary amine is used as the amine compound, as a thirteenth aspect, the production method of the hydrophobic organic solvent dispersed sol according to the eleventh aspect or the twelfth aspect, in which at least one selected from the group consisting of methyl alcohol, ethyl alcohol, isopropyl alcohol, dimethylformamide, ethylcellosolve, butylcellosolve, ethylene glycol, and propylene glycol monomethyl ether is used as the hydrophilic organic solvent, and at least one of methyl ethyl ketone, methyl isobutyl ketone, cyclohexanone, hexane, ethyl acetate, butyl acetate, methyl methacrylate, diisopropyl ether, and toluene is used as the hydrophobic organic solvent having a solubility of water of 0.05 to 12% by mass, as a fourteenth aspect, a polymerizable organic compound composition containing the silane treated modified metal oxide colloidal particle according to any one of the first aspect to the third aspect and a polymerizable organic compound, as a fifteenth aspect, the polymerizable organic compound composition according to the fourteenth aspect in which the polymerizable organic compound is a cationic-polymerizable resin, as a sixteenth aspect, the polymerizable organic compound composition according to the fourteenth aspect in which the polymerizable organic compound is a liquid polymerizable epoxy resin, as a seventeenth aspect, the polymerizable organic compound composition according to the fourteenth aspect in which the polymerizable organic compound is a polymerizable epoxy resin having in the molecule thereof, one or more epoxy cyclohexyl group(s), as an eighteenth aspect, the polymerizable organic compound composition according to the fourteenth aspect in which the polymerizable organic compound is both of or any one of an acrylic monomer and an acrylic oligomer, and as a nineteenth aspect, a fine powder containing the silane treated modified metal oxide colloidal particle according to any one of the first aspect to the third aspect and having an average particle diameter of 0.1 to 100 μm.

Effects of the Invention

The silane treated modified metal oxide colloidal particle of the present invention can be obtained as a sol of a hydrophilic organic solvent or a hydrophobic organic solvent having a solubility of water of 0.05 to 12% by mass. The silane treated modified metal oxide colloidal particle of the present invention can also be dispersed in various polymerizable organic compounds to obtain a polymerizable organic compound composition and further, a fine powder containing the silane treated modified metal oxide colloidal particle can be redispersed in various organic solvents. By these properties, the silane treated modified metal oxide colloidal particle has high dispersibility in various organic solvents and causes no agglomeration of the primary particle thereof, so that the silane treated modified metal oxide colloidal particle can be added to various materials to be applied. The colloidal particle has characteristics such as a high refractive index, ultrafine particle, and a high hardness, so that by being dispersed in various polymerizable organic compounds to be used, the colloidal particle can be expected to enhance various performances of the cured film obtained therefrom such as transparency, flame retardancy, heat resistance, light resistance, weatherability, electric insulation, chemical resistance, hardness, and dynamic strength.

MODES FOR CARRYING OUT THE INVENTION

The colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm can be produced by a publicly known method such as an ion exchange method, a peptizting method, a hydrolysis method, and a reaction method.

Examples of the ion exchange method include a method for treating an acidic salt of the above metal with a hydrogen-type ion exchange resin and a method for treating a basic salt of the above metal with a hydroxy group-type anion exchange resin.

Examples of the peptizting method include a method including: neutralizing an acidic salt of the above metal with a base to obtain a gel, or neutralizing a basic salt of the above metal with an acid to obtain a gel; washing the obtained gel; and peptizting the gel with an acid or a base.

Examples of the hydrolysis method include a method for hydrolyzing an alkoxide of the above metal and a method including: hydrolyzing a basic salt of the above metal under heating; and removing an unnecessary acid.

Examples of the reaction method include a method for reacting a powder of the above metal with an acid.

The metal oxide colloidal particle (A) as the core is an oxide of at least one metal selected from the group consisting of Ti, Fe, Zr, Sn, Ta, Nb, Y, Mo, W, Pb, In, Bi, and Sr. The metal oxide colloidal particle (A) is an oxide of a metal having a valence of 2 to 6 and examples of the form of the oxide include $TiO_2$, $Fe_2O_3$, $ZrO_2$, $SnO_2$, $Ta_2O_5$, $Nb_2O_5$, $Y_2O_3$, $MoO_3$, $WO_3$, $PbO$, $In_2O_3 Bi_2O_3$, and $SrO$.

These metal oxides may be used individually or in combination. Examples of the method for using in combination include a method for mixing several types of metal oxides described above, a method for complexing the above metal oxides, and a method for converting the metal oxide into a solid solution at the atomic level.

Examples of the combination include an $SnO_2$—$WO_3$ complex colloidal particle formed by a reaction in which an $SnO_2$ particle and a $WO_3$ particle are chemically bonded with each other in the interface thereof to be complexed, an $SnO_2$—$ZrO_2$ complex colloidal particle formed by a reaction in which an $SnO_2$ particle and a $ZrO_2$ particle are chemically bonded with each other in the interface thereof to be complexed, and a $TiO2$—$ZrO_2$—$SnO2$ complex colloidal particle obtained by a reaction in which $TiO_2$, $ZrO_2$, and $SnO_2$ form a solid solution at the level of atoms.

The metal oxide colloidal particle (A) as the core can also be used as a compound formed by a combination of metal components and examples thereof include $TiSrO_3$ and $TiBaO_3$.

As the aqueous sol of the metal oxide colloidal particle (A) as the core in the present invention, an aqueous sol having pH 5 to 11.5, preferably pH 7 to 11.5 can be used. pH of the aqueous sol can be adjusted, if necessary, with an alkaline component and examples of the used alkaline component include: a hydroxide of an alkali metal such as lithium, sodium, and potassium; a hydroxide of an alkaline earth metal such as calcium, magnesium, and strontium; ammonia; an alkylamine such as ethylamine, triethylamine, isopropylamine, and n-propylamine; an aralkylamine such as benzylamine; an alicyclic amine such as piperidine; an alkanolamine such as monoethanolamine and triethanolamine; and quaternary ammonium hydroxide.

The silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of $M/(SnO_2+SiO_2)$ (where M is an amine compound) of 0.001 to 0.08 with which the colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core in the present invention is coated, is obtained by a method including: preparing as a precursor of the colloidal particle (B), an aqueous sol of the silicon dioxide-stannic oxide complex oxide colloidal particle (B') having a mass ratio of silicon dioxide/stannic oxide of 0.1 to 5.0, having a primary particle diameter of 1 to 4 nm, and stabilized by an amine compound existing in a molar ratio of $M/(SnO_2+SiO_2)$ (where M is an amine compound) of 0.1 to 1.0; adding this aqueous sol to the aqueous sol of the metal oxide colloidal particle (A); coating the surface of the metal oxide colloidal particle (A) with the silicon dioxide-stannic oxide complex oxide colloidal particle (B'); removing the amine compound for stabilizing the colloidal particle (B') by cation exchange; and bonding to the surface of the modified metal oxide colloidal particle (C), an amine compound in an amount appropriate for stabilizing the colloidal particle (C). The amount of the amine compound appropriate for stabilizing the modified metal oxide colloidal particle (C) is an amount of 0.001 to 0.08 as the molar ratio of $M/(SnO_2+SiO_2)$ (where M is an amine compound). When the amount of the amine compound bonded to the silicon dioxide-stannic oxide complex oxide colloidal particle (B) is an amount of less than 0.001 as the molar ratio of $M/(SnO_2+SiO_2)$, the dispersion stability of the hydrophilic organic solvent dispersed sol or the hydrophobic organic solvent dispersed sol having a solubility of water of 0.05 to 12% by mass of the present invention is unsatisfactory, which is not preferred. When the amount of the amine compound is an amount more than 0.08 as the molar ratio of $M/(SnO_2+SiO_2)$, the bonding of the silyl group of General Formula (I) to be bonded to the particle surface of the modified metal oxide colloidal particle (C) is hindered, which is not preferred.

The silicon dioxide-stannic oxide complex oxide colloidal particle (B') can be obtained by utilizing the publicly known methods shown below (for example, Japanese Examined Patent Application Publication No. 50-40119 (JP 50-40119 B)). That is, by mixing an alkali silicate aqueous solution or a silicic acid sol liquid with an alkali stannate aqueous solution and removing cations by a cation exchange resin to form a silicon dioxide-stannic oxide complex colloidal particle having a primary particle diameter of 1 to 4 nm and by adding an amine compound to a colloidal solution in which the colloidal particle is dispersed and mixing the resultant mixture, an aqueous sol of the silicon dioxide-stannic oxide complex colloidal particle stabilized by an amine compound can be obtained.

It is presumed that the amine compound adsorbs on the surface of the silicon dioxide-stannic oxide complex oxide colloidal particle (B') and otherwise, the amine compound is dissolved and exists in a dispersion medium of the aqueous sol to maintain the dispersion stability of the colloidal particle (B'). When the amine compound is not added or is added in such an amount that the molar ratio of $M/(SnO_2+SiO_2)$ becomes less than 0.1, the colloidal solution obtained by mixing the alkali silicate aqueous solution or the silicic acid sol liquid with the alkali stannate aqueous solution and removing cations by a cation exchange resin loses stability after being left for several hours to be gelled, so that such a colloidal solution cannot be used. This added amount of the amine compound that the molar ratio of $M/(SnO_2+SiO_2)$ (where M is an amine compound) becomes 0.1 to 1.0 is an amount sufficient for maintaining the dispersion stability of the aqueous sol of the silicon dioxide-stannic oxide complex oxide colloidal particle (B'). If the molar ratio of $M/(SnO_2+SiO_2)$ exceeds 1.0, the amine compound exists only excessively, which is not efficient.

For the alkali silicate aqueous solution, sodium silicate and potassium silicate can be used and for the silicic acid sol liquid, activated silicic acid obtained by cation-exchanging the alkali silicate aqueous solution can be used. As the alkali stannate aqueous solution, a sodium stannate aqueous solution can preferably be used.

The amine compound used in the present invention is at least one selected from the group consisting of a primary amine, a secondary amine, and a tertiary amine. Examples of the primary amine include methylamine, ethylamine, propylamine, isopropylamine, butylamine, isobutylamine, amylamine, allylamine, hexylamine, heptylamine, octylamine, nonylamine, decylamine, dodecylamine, cyclopropylamine, cyclobutylamine, cyclopentylamine, and cyclohexylamine. Examples of the secondary amine include dimethylamine, diethylamine, dipropylamine, diisopropylamine, dibutylamine, diisobutylamine, N-ethyl-1,2-dimethylpropylamine, diamylamine, and diallylamine. Examples of the tertiary amine include trimethylamine, triethylamine, tripropylamine, tributylamine, triamylamine, and triallylamine.

The silane treated modified metal oxide colloidal particle of the present invention is a modified metal oxide colloidal particle produced by coating an outer surface of a metal oxide colloidal particle as the core with a complex oxide colloidal particle, the modified metal oxide colloidal particle being a modified metal oxide colloidal particle (C) produced by coating an outer surface of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core with a silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of $M/(SnO_2+SiO_2)$ (where M is an amine compound) of 0.001 to 0.08. To the particle surface of the modified metal oxide colloidal particle (C) in which the mass ratio (B)/(A) of the complex oxide colloidal particle (B) relative to the metal oxide colloidal particle (A) is 0.05 to 0.50, 1 to 4 silyl group(s) per 1 $nm^2$ of the surface area of the particle surface is (are) bonded.

The modified metal oxide colloidal particle (C) can be obtained by a method including: mixing an aqueous sol of the metal oxide colloidal particle (A) used as the core with an aqueous sol of the silicon dioxide-stannic oxide complex oxide colloidal particle (B') having a mass ratio of silicon dioxide/stannic oxide of 0.1 to 5.0, having a primary particle diameter of 1 to 4 nm, and stabilized by an amine compound existing in a molar ratio of $M/(SnO_2+SiO_2)$ (where M is an amine compound) of 0.1 to 1.0 in such amounts that the mass ratio (B')/(A) converted into the mass of the metal oxide becomes 0.05 to 0.50 to obtain an aqueous sol of the modified metal oxide colloidal particle (C'); removing the amine compound from the aqueous sol by cation-exchanging the aqueous sol; and adding to the aqueous sol, an amine compound in such an amount that the molar ratio of $M/(SnO_2+SiO_2)$ (where M is an amine compound) of the amine compound relative to the silicon dioxide-stannic oxide complex oxide colloidal particle (B') becomes 0.001 to 0.08.

The aqueous sol of the modified metal oxide colloidal particle (C) can contain any other components so long as the object of the present invention is achieved. Particularly, by blending in the aqueous sol, oxy-carboxylic acids in an amount of about 10% by weight, based on the total weight of all the metal oxides, there can be obtained a colloid in which the performance such as the dispersibility is further improved.

Examples of the used oxy-carboxylic acid include lactic acid, tartaric acid, malic acid, citric acid, and gluconic acid. The aqueous sol can contain an alkaline component such as a hydroxide of an alkali metal such as lithium, sodium, potassium, rubidium, and cesium and ammonia. These alkaline components can be used in combination with the above acid component.

The aqueous sol of the modified metal oxide colloidal particle (C) can be concentrated to about 50% by mass as the total amount of all the metal oxides of the modified metal oxide colloidal particle (C), for example, by an evaporation method, an ultrafiltration method, or the like.

The silane treated modified metal oxide colloidal particle of the present invention is a colloidal particle in which to the surface of the modified metal oxide colloidal particle (C), 1 to 4 silyl group(s) of General Formula (I) below:

$$—Si(R^1)_a(X)_{3-a} \quad \text{General Formula (I)}$$

(where $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a $C_{1-4}$ alkoxy group; and a is an integer of 0 to 3) per 1 $nm^2$ of the surface area is (are) bonded.

The number of silyl groups per 1 $nm^2$ of the surface area of the modified metal oxide colloidal particle (C) can be measured using an ICP emission spectroscopic analysis method or a CHN element analysis method. The specific surface area of the modified metal oxide colloidal particle (C) can be measured by a nitrogen adsorption method.

The silyl group can be bonded to the surface of the modified metal oxide colloidal particle (C) of the present invention by reacting an organic silicon compound of General Formula (II) below:

$$(R^1)_aSi(X)_{4-a} \quad \text{General Formula (II)}$$

(where $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a $C_{1-4}$ alkoxy group; and a is an integer of 0 to 3) or General Formula (III):

$$(R^1_3Si)_2NH \quad \text{General Formula (III)}$$

(where $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group) with the surface of the colloidal particle.

The organic silicon compound used in the silylation of the present invention will be described in detail.

In General Formulae (II) and (III), $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a $C_{1-4}$ alkoxy group; and a is an integer of 0 to 3.

The alkyl group is preferably a $C_{1-30}$ alkyl group, more preferably a $C_{1-18}$ alkyl group and examples thereof include a methyl group, an ethyl group, a propyl group, an isopropyl group, a hexyl group, a tert-butyl group, a sec-butyl group, a decyl group, a dodecyl group, and an octadecyl group.

Examples of the aryl group include a phenyl group and a naphthyl group. Preferred is a phenyl group.

In General Formula (II), X is a hydroxy group or a hydrolyzable group such as a $C_{1-4}$ alkoxy group, and examples thereof include a methoxy group, an ethoxy group, a propoxy group, and a butoxy group. a is an integer of 0 to 3. When $R^1$ or X exists in plurality, $R^1$s or Xs may be the same as or different from each other. a is preferably 1 or 2, particularly preferably 1.

The substituent contained in $R^1$ is not particularly limited and examples thereof include a halogen atom (such as a fluorine atom, a chlorine atom, and a bromine atom), a hydroxy group, a mercapto group, a carboxy group, an epoxy group, an alkyl group (such as methyl, ethyl, isopropyl, propyl, and tert-butyl), an aryl group (such as phenyl and naphthyl), an aromatic heterocyclic group (such as furyl, pyrazolyl, and pyridyl), an alkoxy group (such as methoxy, ethoxy, and isopropoxy), aryloxy (such as phenoxy), an alkenyl group (such as vinyl and 1-propenyl), an acyloxy group (such as acetoxy, acryloyloxy, and methacryloyloxy), an alkoxycarbonyl group (such as methoxycarbonyl and ethoxycarbonyl), an aryloxycarbonyl group (such as phenoxycarbonyl), a carbamoyl group (such as carbamoyl and N-methylcarbamoyl), and an acylamino group (such as acetylamino, benzoylamino, acrylamino, and methacrylamino) and these substituents may be further substituted.

When $R^1$ exists in plurality, at least one of $R^1$s is preferably a substituted alkyl group or a substituted aryl group.

Examples of the organic silicon compound of General Formula (II) include tetramethoxysilane, tetraethoxysilane, tetra(n-propoxy)silane, tetra(isopropoxy)silane, tetra(n-butoxy)silane, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenetyloxysilane, propyltrimethoxysilane, hexyltrimethoxysilane, hexyltriethoxysilane, octyltriethoxysilane, decyltrimethoxysilane, dodecyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane,
glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, and methylvinyldiethoxysilane, and these organic silicon compounds may be used individually or in combination of two or more types thereof.

The hydrolysis product of the organic silicon compound of General Formula (II) is a compound in which a part or the whole of $R^1$ and X in General Formula (II) is substituted with a hydrogen atom. These hydrolysis products of the organic silicon compound of General Formula (II) may be used individually or in combination of two or more types thereof.

The hydrolysis of the organic silicon compound is performed by adding to the organic silicon compound, water or if desired, an acidic aqueous solution such as a hydrochloric acid aqueous solution, a sulfuric acid aqueous solution, and an acetic acid aqueous solution and by stirring the resultant mixture.

In the present invention, as the organic silicon compound used for the silylation, preferably used is at least one selected from the group consisting of the compounds of General Formula (II) and hydrolysis products thereof. Particularly preferred are methyltrimethoxysilane, phenyltrimethoxysilane, methyltriethoxysilane, methacryloxypropyltrimethoxysilane, and/or hydrolysis products thereof.

Examples of the organic silicon compound of General Formula (III) include hexamethyldisilazane, hexaethyldisilazane, hexa(tert-butyl)disilazane, hexabutyldisilazane, hexaoctyldisilazane, hexacyclohexyldisilazane, and hexaphenyldisilazane. In the present invention, particularly preferred is hexamethyldisilazane to be used.

In the present invention, for the silylation, it is also preferred to use at least one selected from the group consisting of the compounds of General Formula (II) and hydrolysis products thereof in combination with the organic silicon compound of General Formula (III).

The silane treated modified metal oxide colloidal particle of the present invention can be obtained as a hydrophilic organic solvent dispersed sol thereof.

Examples of the hydrophilic organic solvent include: lower alcohols such as methyl alcohol, ethyl alcohol, and isopropyl alcohol; cyclic amides such as dimethylformamide; and glycols such as ethylcellosolve, butylcellosolve, ethylene glycol, and propylene glycol monomethyl ether, and these solvents may be used in combination thereof.

The hydrophilic organic solvent dispersed sol of the silane treated modified metal oxide colloidal particle of the present invention has 0.1 to 50% by mass, preferably 1 to 30% by mass of the total concentration of all the metal oxides of the modified metal oxide colloidal particle (C). The total concentration of all the metal oxides can be increased, if necessary, to more than 50% by mass.

The silane treated modified metal oxide colloidal particle of the present invention can be obtained as a hydrophobic organic solvent dispersed sol thereof in which the hydrophobic organic solvent has a solubility of water of 0.05 to 12% by mass.

In the present invention, the solubility of water in the hydrophobic organic solvent refers to a water content in the organic phase when mixing an organic solvent with water at 20° C. to form two phases.

Examples of the hydrophobic organic solvent having a solubility of water of 0.05 to 12% by mass used in the present invention include 1-pentanol (solubility in water: 6.8% by mass), methyl ethyl ketone (solubility in water: 9.9% by mass), methyl isobutyl ketone (solubility in water: 1.8% by mass), cyclohexanone (solubility in water: 8% by mass), ethyl acetate (solubility in water: 2.9% by mass), butyl acetate (solubility in water: 1.9% by mass), methyl methacrylate (solubility in water: 1.1% by mass), diisopropyl ether (solubility in water: 0.55% by mass), dibutyl ether (solubility in water: 0.2% by mass), and toluene (solubility in water: 0.05% by mass).

The hydrophobic organic solvent dispersed sol in which the hydrophobic organic solvent has a solubility of water of 0.05 to 12% by mass containing the silane treated modified metal oxide colloidal particle of the present invention has 0.1 to 50% by mass, preferably 1 to 30% by mass of the total concentration of all the metal oxides of the modified metal oxide colloidal particle (C). The total concentration of all the metal oxides can be increased, if necessary, to more than 50% by mass.

The hydrophilic organic solvent dispersed sol of the silane treated modified metal oxide colloidal particle of the present invention can be produced by a method including processes (a), (b), (c), (d), (e), and (f):

a process (a): preparing an aqueous solution containing an alkali stannate and an alkali silicate in such amounts that the mass ratio of silicon dioxide/stannic oxide becomes 0.1 to 5; removing cations existing in the aqueous solution to prepare an aqueous sol of a silicon dioxide-stannic oxide complex colloidal particle having a primary particle diameter of 1 to 4 nm; and adding to the aqueous sol, an amine compound in such an amount that the molar ratio of $M/(SnO_2+SiO_2)$ (where M is an amine compound) becomes 0.1 to 1.0 to obtain an aqueous sol of a silicon dioxide-stannic oxide complex oxide colloidal particle (B') having a mass ratio of silicon dioxide/stannic oxide of 0.1 to 5.0, having a primary particle diameter of 1 to 4 nm, and stabilized by an amine compound existing in a molar ratio of $M/(SnO_2+SiO_2)$ (where M is an amine compound) of 0.1 to 1.0, a process (b): mixing an aqueous sol of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm and the aqueous sol obtained in the process (a) in such amounts that the mass ratio (B')/(A) of the silicon dioxide-stannic oxide complex oxide colloidal particle (B') relative to the metal oxide colloidal particle (A) becomes 0.05 to 0.50 to obtain an aqueous sol of a modified metal oxide colloidal particle (C') produced by coating the metal oxide colloidal particle (A) with the silicon dioxide-stannic oxide complex oxide colloidal particle (B'), a process (c): cation-exchanging the aqueous sol of the modified metal oxide colloidal particle (C') obtained in the process (b) to remove the amine compound added in the process (a), a process (d): adding to the aqueous sol obtained in the process (c), an amine compound in such an amount that the molar ratio M/(SnO$_2$+SiO$_2$) (where M is an mine compound) of the amine compound relative to the silicon dioxide-stannic oxide complex oxide colloidal particle (B') becomes 0.001 to 0.08 to obtain an aqueous sol of the modified metal oxide colloidal particle (C) produced by coating an outer surface of the oxide colloidal particle (A) as the core with the silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of M/(SnO$_2$+SiO$_2$) (where M is an amine compound) of 0.001 to 0.08, the modified metal oxide colloidal particle (C) having the mass ratio (B)/(A) of the silicon dioxide-stannic oxide complex oxide colloidal particle (B) relative to the metal oxide colloidal particle (A) being 0.05 to 0.50, a process (e): exchanging the dispersion medium of the aqueous sol obtained in the process (d) for a hydrophilic organic solvent, and a process (f): adding to the hydrophilic organic solvent dispersed sol obtained in the process (e), at least one of compound selected from the group consisting of an organic silicon compound of General Formula (II) below:

$$Si(R^1)_a(X)_{4-a} \qquad \text{General Formula (II)}$$

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a C$_{1-4}$ alkoxy group; and a is an integer of 0 to 3), a hydrolysis product thereof, and an organic silicon compound of General Formula (III) below:

$$(R^1{}_3Si)_2NH \qquad \text{General Formula (III)}$$

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group) so that the mass ratio of the organic silicon compound relative to the modified metal oxide colloidal particle (C) becomes 0.01 to 0.50 to bond a silyl group of General Formula (I):

$$—Si(R^1)_a(X)_{3-a} \qquad \text{General Formula (I)}$$

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a C$_{1-4}$ alkoxy group; and a is an integer of 0 to 3) to the surface of the modified metal oxide colloidal particle (C).

In the process (a), as the alkali stannate, sodium stannate or potassium stannate can be used and preferred is sodium stannate.

As the alkali silicate, sodium silicate and potassium silicate can be used.

As the alkali stannate and the alkali silicate, an aqueous solution containing silicon dioxide and stannic oxide in a mass ratio of silicon dioxide/stannic oxide of 0.1 to 5 is prepared and from the aqueous solution, cations existing in the aqueous solution are removed by a cation exchange resin.

The alkali stannate and the alkali silicate so weighed that the mass ratio of silicon dioxide/stannic oxide becomes a ratio of 0.1 to 5.0 are dissolved in water to prepare an aqueous solution thereof. A preferred solid content concentration in the aqueous solution is 1 to 12% by mass as (SnO$_2$+SiO$_2$).

From the prepared aqueous solution, cations are removed using a cation exchange resin. As the cation exchange resin, a hydrogen-type strong acidic cation exchange resin is preferred and, for example, Amberlite (registered trademark) 120B or the like can be filled in a column to be used. By performing the cation exchange, the silicic acid component and the stannic acid component are polymerized to form a silicon dioxide-stannic oxide complex colloidal particle having a primary particle diameter of 1 to 4 nm.

This silicon dioxide-stannic oxide complex colloidal particle is poor in stability and when the colloidal particle is left stand still, the colloidal particle is gelled within several hours, so that it is necessary to rapidly stabilize the colloidal particle after the cation exchange by adding to the colloidal particle, an amine compound to convert the colloidal particle into an aqueous sol of the silicon dioxide-stannic oxide complex oxide colloidal particle (B') having a mass ratio of silicon dioxide/stannic oxide of 0.1 to 5.0, having a primary particle diameter of 1 to 4 nm, and stabilized by an amine compound existing in a molar ratio of M/(SnO$_2$+SiO$_2$) (where M is an amine compound) of 0.1 to 1.0. The obtained aqueous sol has a concentration of 0.1 to 10% by mass as (SnO$_2$+SiO$_2$).

For stabilizing the silicon dioxide-stannic oxide complex colloidal particle formed by the cation exchange, it is appropriate to add an amine compound in such an amount that the molar ratio of M/(SnO$_2$+SiO$_2$) (where M is an amine compound) becomes 0.1 to 1.0. If an amine compound is added in such an amount that the molar ratio of M/(SnO$_2$+SiO$_2$) fails to reach 0.1 to 1.0, the colloidal particle loses stability after being left stand still for several hours to be gelled, which is not preferred.

Next, in the process (b), by mixing the aqueous sol of the colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm and the aqueous sol of the silicon dioxide-stannic oxide complex oxide colloidal particle (B') having a mass ratio of silicon dioxide/stannic oxide of 0.1 to 5.0, having a primary particle diameter of 1 to 4 nm, and stabilized by an amine compound existing in a molar ratio of M/(SnO$_2$+SiO$_2$) (where M is an amine compound) of 0.1 to 1.0 which is obtained in the process (a) in such mixing ratio that the mass ratio (B')/(A) of the silicon dioxide-stannic oxide complex oxide colloidal particle (B') relative to the metal oxide colloidal particle (A) becomes 0.05 to 0.50, there can be obtained the aqueous sol of the modified metal oxide colloidal particle (C') produced by coating the metal oxide colloidal particle (A) with the silicon dioxide-stannic oxide complex oxide colloidal particle (B').

The aqueous sol of the metal oxide colloidal particle (A) has a solid content concentration of 0.5 to 50% by mass, and preferably 5 to 30% by mass.

As the aqueous sol of the metal oxide colloidal particle (A), an aqueous sol having pH 5 to 11.5, preferably pH 7 to 11.5 can be used. pH of the aqueous sol can be adjusted, if necessary, by an alkaline component and examples of the alkaline component used therefor include: a hydroxide of an alkali metal such as lithium, sodium, and potassium; a hydroxide of an alkaline earth metal such as calcium, magnesium, and strontium; ammonia; an alkylamine such as ethylamine, triethylamine, isopropylamine, and n-propylamine; an aralkylamine such as benzylamine; an alicyclic amine such as piperidine; an alkanolamine such as monoethanolamine and triethanolamine; and quaternary ammonium hydroxide.

The mixing of the aqueous sol of the metal oxide colloidal particle (A) and the aqueous sol obtained in the process (a) is preferably performed while stirring the resultant mixture.

The mixing ratio of the silicon dioxide-stannic oxide complex oxide colloidal particle (B') relative to the metal oxide colloidal particle (A) is preferably 0.05 to 0.50 as the mass ratio (B')/(A). When the mixing ratio as the mass ratio (B')/(A) is less than 0.05, the coating of the metal oxide colloidal particle (A) as the core with the silicon dioxide-stannic oxide complex oxide colloidal particle (B') cannot be satisfactorily performed, so that there cannot be obtained a stable hydrophilic organic solvent dispersed sol or a stable hydrophobic organic solvent dispersed sol in which the hydrophobic organic solvent has a solubility of water of 0.05 to 12% by mass. The sufficient mass ratio is 0.50, and if the mass ratio is more than 0.50, it is not efficient.

Next, in the process (c), the cation exchange of the aqueous sol of the modified metal oxide colloidal particle (C') obtained in the process (b) is performed. For the cation exchange, a hydrogen-type strong acidic cation exchange resin is preferably used.

Next, in the process (d), to the aqueous sol obtained in the process (c), an amine compound in such an amount that the molar ratio of M/(SnO$_2$+SiO$_2$) (where M is an amine compound) of the amine compound relative to the silicon dioxide-stannic oxide complex oxide colloidal particle (B') becomes 0.001 to 0.08 is added. When the amount of the amine compound added is less than 0.001 as the molar ratio of M/(SnO$_2$+SiO$_2$), the dispersion stability of the hydrophilic organic solvent dispersed sol of the present invention becomes unsatisfactory, which is not preferred. When the amount of the amine compound as the molar ratio of M/(SnO$_2$+SiO$_2$) exceeds 0.08, the bonding of the silyl group of General Formula (I) to the particle surface of the modified metal oxide colloidal particle (C) is hindered, which is not preferred.

Next, in the process (e), the aqueous sol obtained in the process (d) is exchanged for a hydrophilic organic solvent. As the method for exchanging a water dispersion medium for a hydrophilic organic solvent, there can be used a publicly known method such as an evaporation exchange method under normal pressure or reduced pressure, an ultrafiltration membrane method, and a solvent extraction method.

For efficiently performing the solvent exchange, the aqueous sol obtained in the process (d) is preferably concentrated beforehand so that the concentration of the modified metal oxide colloidal particle (C) contained in the aqueous sol falls within a range of 1 to 70% by mass or 10 to 50% by mass. The concentration of the sol can be performed using a publicly known method such as a heating evaporation method and an ultrafiltration method. The solvent exchange is performed at a temperature of the sol in a range from room temperature to a boiling point of the hydrophilic solvent. The solvent exchange is performed until the water content in the sol becomes less than 5% by mass. The concentration of the solid content in the sol obtained in the process (e) is 20 to 70% by mass as the concentration of all the metal oxides of the modified metal oxide colloidal particle (C).

Examples of the used hydrophilic organic solvent include: lower alcohols such as methyl alcohol, ethyl alcohol, and isopropyl alcohol; cyclic amides such as dimethylformamide; and glycols such as ethylcellosolve, butylcellosolve, ethylene glycol, and propylene glycol monomethyl ether.

Next, in the process (f), to the hydrophilic organic solvent dispersed sol obtained in the process (e), at least one of compound selected from the group consisting of an organic silicon compound of General Formula (II) below:

Si(R$^1$)$_a$(X)$_{4-a}$    General Formula (II)

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a C$_{1-4}$ alkoxy group; and a is an integer of 0 to 3), a hydrolysis product thereof, and an organic silicon compound of General Formula (III) below:

(R$^1$$_3$Si)$_2$NH    General Formula (III)

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group) is added so that the mass ratio of the organic silicon compound relative to the modified metal oxide colloidal particle (C) becomes 0.01 to 0.50 to bond a silyl group of General Formula (I):

—Si(R$^1$)$_a$(X)$_{3-a}$    General Formula (I)

(where R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group; X is a hydroxy group or a C$_{1-4}$ alkoxy group; and a is an integer of 0 to 3) to the surface of the modified metal oxide colloidal particle (C).

Examples of the organic silicon compounds of General Formula (II) and General Formula (III) used in the process (f) are as described above, and by adding to the hydrophilic organic solvent dispersed sol of the modified metal oxide colloidal particle (C) obtained in the process (e), both of or any one of the organic silicon compound of General Formula (II) and the organic silicon compound of General Formula (III) and by aging the resultant mixture, the silyl group of General Formula (I) is bonded to the surface of the modified metal oxide colloidal particle (C).

For generating the silyl group of General Formula (I) from the organic silicon compound of General Formula (II) or the organic silicon compound of General Formula (III), 1 mol to 4 mol of water is necessary relative to 1 mol of the organic silicon compound. This necessary water may be contained beforehand in the hydrophilic organic solvent dispersed sol or may be added after the addition of the organic silicon compound.

After the addition of the organic silicon compound, the aging is performed. The aging can be performed at an aging temperature in a range from normal temperature to a boiling point of the used hydrophilic organic solvent, and when the aging is performed at a temperature around a boiling point of the organic solvent, the reaction efficiency of the silyl group is advantageous, which is preferred.

The aging can be performed under the atmospheric pressure and is preferably performed under reflux.

The organic silicon compound of General Formula (II) may be hydrolyzed beforehand to be added. The hydrolysis product of the organic silicon compound can be obtained by adding to the organic silicon compound, water or if desired, an acidic aqueous solution such as a hydrochloric acid aqueous solution, a sulfuric acid aqueous solution, and an acetic acid aqueous solution and by stirring the resultant mixture.

As the used organic silicon compound, particularly preferred are (is) methyltrimethoxysilane, phenyltrimethoxysilane, methyltriethoxysilane, methacryloxypropyltrimethoxysilane, and/or a hydrolysis product thereof.

By performing the process (f), the hydrophilic organic solvent dispersed sol of the silane treated modified metal oxide colloidal particle in which 1 to 4 silyl group(s) per 1 nm$^2$ of the surface area of the modified metal oxide colloidal particle (C) is(are) bonded can be obtained. The obtained hydrophilic organic solvent dispersed sol has a solid content concentration of 20 to 70% by mass as the concentration of all the metal oxides of the modified metal oxide colloidal particle (C).

The production method of the hydrophobic organic solvent dispersed sol of the present invention in which the hydrophobic organic solvent has a solubility of water of 0.05 to 12% by mass containing a silane treated modified metal oxide colloidal particle characterized by being produced by bonding to the particle surface of a modified metal oxide colloidal particle, 1 to 4 silyl group(s) per 1 nm$^2$ of the surface area of the particle surface of the modified metal oxide colloidal particle which is produced by coating an outer surface of a metal oxide colloidal particle as the core with a complex oxide colloidal particle, the modified metal oxide colloidal particle being a modified metal oxide colloidal particle (C) produced by coating an outer surface of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core with a silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of M/(SnO$_2$+SiO$_2$) (where M is an amine compound) of 0.001 to 0.08, the modified metal oxide colloidal particle (C) having the mass ratio (B)/(A) of the complex oxide colloidal particle (B) relative to the metal oxide colloidal particle (A) being 0.05 to 0.50, is a method including a process (g) for exchanging the hydrophilic organic solvent for a hydrophobic organic solvent having a solubility of water of 0.05 to 12% by mass after the processes (a), (b), (c), (d), (e), and (f) included in the above production method of the hydrophilic organic solvent dispersed sol of the silane treated modified metal oxide colloidal particle.

The exchange of the dispersion medium from the hydrophilic organic solvent to the hydrophobic organic solvent having a solubility of water of 0.05 to 12% by mass is performed at a temperature of the sol in a range from room temperature to a boiling point of the hydrophobic organic solvent having a solubility of water of 0.05 to 12% by mass. The solvent exchange is performed until the hydrophilic organic solvent concentration in the sol becomes less than 2% by mass.

The concentration of all the metal oxides of the sol obtained in the process (g) is 20 to 70% by mass as the concentration of all the metal oxides of the modified metal oxide colloidal particle (C).

The present invention is a polymerizable compound composition containing: a silane treated modified metal oxide colloidal particle characterized by being produced by bonding to the particle surface of a modified metal oxide colloidal particle, 1 to 4 silyl group(s) per 1 nm$^2$ of the surface area of the particle surface of the modified metal oxide colloidal particle which is produced by coating an outer surface of a metal oxide colloidal particle as the core with a complex oxide colloidal particle, the modified metal oxide colloidal particle being a modified metal oxide colloidal particle (C) produced by coating an outer surface of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core with a silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of M/(SnO$_2$+SiO$_2$) (where M is an amine compound) of 0.001 to 0.08, the modified metal oxide colloidal particle (C) having the mass ratio (B)/(A) of the complex oxide colloidal particle (B) relative to the metal oxide colloidal particle (A) being 0.05 to 0.50; and a polymerizable organic compound.

The polymerizable organic compound used in the present invention is an organic compound having in the molecule thereof, one or more polymerizable group(s) in a liquid form at 30° C. The polymerizable organic compound used in the present invention may be any one of a monomer, an oligomer, and a prepolymer. Examples of the polymerizable organic compound include an acrylic monomer, an acrylic oligomer, a polymerizable liquid epoxy resin, a polymerizable oxetane resin, and a polymerizable vinyl ether resin.

The present invention particularly exerts the effect when a cationic-polymerizable resin such as a polymerizable epoxy resin, a polymerizable oxetane resin, and a polymerizable vinyl ether resin is used. When among the polymerizable epoxy resins, a polymerizable epoxy resin having in the molecule thereof, one or more epoxycyclohexyl group(s) is used, the present invention particularly exerts the effect.

Although the acrylic monomer is not particularly limited, specific examples thereof include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis[4-((meth)acryloxydiethoxy)phenyl]propane, 3-phenoxy-2-propanoyl acrylate, 1,6-bis(3-acryloxy-2-hydroxypropyl)-hexyl ether, trimethyrol propane tri(meth)acrylate, glycerol tri(meth)acrylate, tris(2-hydroxylethyl)-isocyanuric acid ester (meth)acrylate, pentaerythritol tri(meth)acrylate, pentaerythritol tetra(meth)acrylate, dipentaerythritol tri(meta)acrylate, dipentaerythritol penta(meta)acrylate, dipentaerythritol hexa(meth)acrylate, tripentaerythritol octa(meta)acrylate, tripentaerythritol hepta(meta)acrylate, 2-hydroxypropyl (meth)acrylate, 2-ethylhexyl (meth)acrylate, 2-norbornylmethyl methacrylate, 2-hydroxy-3-phenoxypropyl (meth)acrylate, 2-hydroxyethyl (meth)acrylate, 2,2-dimethylbutyl acrylate, 2-hydroxybutyl (meth)acrylate, n-propyl (meth)acrylate, n-butyl (meth)acrylate, isobutyl (meth)acrylate, tert-butyl (meth)acrylate, n-hexyl (meth)acrylate, n-pentyl (meth)acrylate, n-octyl (meth)acrylate, 2-methoxyethyl (meth)acrylate, 2-methoxymethoxyethyl acrylate, 3-pentyl (meth)acrylate, 3-methyl-2-norbornylmethyl methacrylate, 3-methoxybutyl (meth)acrylate, 4-hydroxybutyl (meth)acrylate, 4-methyl-2-propylpentyl acrylate, 5-norbornen-2-yl-methyl methacrylate, isopropyl (meth)acrylate, n-octadecyl (meth)acrylate, n-nonyl (meth) acrylate, sec-butyl (meth)acrylate, tert-pentyl (meth)acrylate, ethyl α-hydroxymethylacrylate, butyl α-hydroxymethylacrylate, methyl α-hydroxymethylacrylate, (meth)acrylic acid, n-stearyl acrylate, isooctyl acrylate, isononyl acrylate, isobornyl (meth)acrylate, ethyl (meth)acrylate, ethylcarbitol acrylate, ethoxyethyl (meth)acrylate, ethoxyethoxyethyl (meth)acrylate, ethoxydiethylene glycol acrylate, cyclohexyl (meth)acrylate, cyclohexylmethyl (meth)acrylate, cyclopentyl acrylate, dicyclopentenyloxyethyl acrylate, cetyl acrylate, tetrahydrofurfuryl (meth)acrylate, phenoxyethyl (meth)acrylate, (meth)acryloyloxyethyl hydrogen phthalate, benzyl (meth)acrylate, methyl (meth)acrylate, methoxyethyl (meth) acrylate, methoxyethoxyethyl (meth)acrylate, methoxypolyethylene glycol (meth)acrylate, lauryl (meth)acrylate, 1,3-butanediol di(meth)acrylate, 1,4-butandiol di(meth)acrylate, 1,6-hexanediol di(meth)acrylate, 1,9-nonandiol di(meth)acrylate, allylated cyclohexyl di(meth)acrylate, glycerin di(meth) acrylate, dicyclopentanyl di(meth)acrylate, tricyclodecane dimethanol di(meth)acrylate, trimethylolpropane di(meth) acrylate, neopentyl glycol adipate di(meth)acrylate, neopentyl glycol di(meth)acrylate, neopentyl glycol hydroxypivalate ester diacrylate, ethoxylated trimethylolpropane tri (meth)acrylate, glycerinpropoxy tri(meth)acrylate, trimethylolpropane polyethoxy tri(meth)acrylate, propionic acid-modified dipentaerythritol tri(meth)acrylate, ditrimethylolpropane tetra(meth)acrylate, propionic acid-modified dipentaerythritol tetra(meth)acrylate, propoxylated pentaerythritol tetra(meth)acrylate, propionic acid-modified dipentaerythritol penta(meth)acrylate, and glycidyl methacrylate.

Here, for example, ethylene glycol di(meth)acrylate refers to "ethylene glycol diacrylate or ethylene glycol dimethacrylate".

Although the acrylic oligomer is not particularly limited, representative examples thereof include an epoxy acrylate oligomer, a urethane acrylate oligomer, and a polyester acrylate oligomer.

Although the polymerizable epoxy resin is not particularly limited, specific examples thereof include 1,4-butanediol diglycidyl ether, 1,2-epoxy-4-(epoxyethyl)cyclohexane, glycerol triglycidyl ether, diethylene glycol diglycidyl ether, 2,6-diglycidyl phenyl glycidyl ether, 1,1,3-tris[p-(2,3-epoxypropoxy)phenyl]propane, 1,2-cyclohexane dicarboxylic acid diglycidyl ester, 4,4'-methylenebis(N,N-diglycidylaniline), 3,4-epoxycyclohexylmethyl-3,4-epoxycyclohexane carboxylate, trimethylol ethane triglycidyl ether, triglycidyl-p-aminophenol, tetraglycidyl metaxylenediamine, tetraglycidyl diaminodiphenyl methane, tetraglycidyl-1,3-bisaminomethylcyclohexane, bisphenol-A-diglycidyl ether, bisphenol-S-diglycidyl ether, pentaerythritol tetraglycidyl ether resorcinol diglycidyl ether, phthalic acid diglycidyl ester, neopentyl glycol diglycidyl ether, polypropylene glycol diglycidyl ether, tetrabromo bisphenol-A-diglycidyl ether, bisphenol hexafluoroacetone diglycidyl ether, pentaerythritol diglycidyl ether, hydrogenated bisphenol-A-diglycidyl ether, tris-(2,3-epoxypropyl)isocyanurate, 1-{2,3-di(propionyloxy)}-3,5-bis(2,3-epoxypropyl)-1,3,5-triazine-2,4,6-(1H,3H,5H)-trion e, 1,3-bis{2,3-di(propionyloxy)}-5-(2,3-epoxypropyl)-1,3,5-triazine-2,4,6-(1H,3H,5H)-trione, monoallyldiglycidyl isocyanurate, diglycerol polydiglycidyl ether, pentaerythritol polyglycidyl ether, 1,4-bis(2,3-epoxypropoxyperfluoroisopropyl)cyclohexane, sorbitol polyglycidyl ether, trimethyrolpropane polyglycidyl ether, resorcin diglycidyl ether, 1,6-hexanediol diglycidyl ether, polyethylene glycol diglycidyl ether, phenyl glycidyl ether, p-tert-butylphenyl glycidyl ether, adipic acid diglycidyl ether, o-phthalic acid diglycidyl ether, dibromophenyl glycidyl ether, 1,2,7,8-diepoxyoctane, 1,6-dimethyrolperfluorohexane diglycidyl ether, 4,4'-bis(2,3-epoxypropoxyperfluoroisopropyl) diphenyl ether, 2,2-bis(4-glycidyloxyphenyl)propane, 3,4-epoxycyclohexylmethyl-3',4'-epoxycyclohexane carboxylate, 3,4-epoxycyclohexyl oxirane, 2-(3,4-epoxycyclohexyl)-3',4'-epoxy-1,3-dioxane-5-spirocyclohexane, 1,2-ethylenedioxy-bis(3,4-epoxycyclohexylmethane), 4',5'-epoxy-2'-methylcyclohexylmethyl-4,5-epoxy-2-methylcyclohexane carboxylate, ethylene glycol-bis(3,4-epoxycyclohexanecarboxylate), bis-(3,4-epoxycyclohexylmethyl)adipate, and bis(2,3-epoxycyclopentyl)ether.

Among them, examples of the polymerizable epoxy resin containing in the molecule thereof, one or more epoxycyclohexyl group(s) include 3,4-epoxycyclohexylmethyl-3',4'-epoxycyclohexane carboxylate, 3,4-epoxycyclohexyl oxirane, 2-(3,4-epoxycyclohexyl)-3',4'-epoxy-1,3-dioxane-5-spirocyclohexane, 1,2-ethylenedioxy-bis(3,4-epoxycyclohexylmethane), 4',5'-epoxy-2'-methylcyclohexylmethyl-4,5-epoxy-2-methylcyclohexane carboxylate, ethylene glycol-bis(3,4-epoxycyclohexanecarboxylate), bis-(3,4-epoxycyclohexylmethyl)adipate, and bis(2,3-epoxycyclopentyl)ether.

Although the polymerizable oxetane resin is not particularly limited, specific examples thereof include 3-ethyl-3-hydroxymethyloxetane, 3-ethyl-3-(phenoxymethyl)oxetane, 3,3-diethyloxetane, and 3-ethyl-3-(2-ethylhexyloxymethyl) oxetane, 1,4-bis(((3-ethyl-3-oxetanyl)methoxy)methyl)benzene, di((3-ethyl-3-oxetanyl)methyl) ether, and pentaerythritol tetrakis((3-ethyl-3-oxetanyl)methyl) ether.

Although the polymerizable vinyl ether resin is not particularly limited, specific examples thereof include vinyl-2-chloroethyl ether, vinyl-n-butyl ether, 1,4-cyclohexanedimethanol divinyl ether, vinylglycidyl ether, bis(4-(vinyloxymethyl)cyclohexylmethyl)glutarate, tri (ethyleneglycol) divinyl ether, adipic acid divinyl ester, diethylene glycol divinyl ether, tris(4-vinyloxy)butyl trimellilate, bis(4-(vinyloxy)butyl) terephthalate, bis(4-(vinyloxy) butylisophthalate, ethylene glycol divinyl ether, 1,4-butanediol divinyl ether, tetramethylene glycol divinyl ether, tetraethylene glycol divinyl ether, neopentyl glycol divinyl ether, trimethylol propane trivinyl ether, trimethylol ethane trivinyl ether, hexanediol divinyl ether, 1,4-cyclohexanediol divinyl ether, tetraethylene glycol divinyl ether, pentaerythritol divinyl ether, pentaerythritol trivinyl ether, and cyclohexane dimethanol divinyl ether.

The polymerizable compound composition can be obtained as a polymer in which silane treated modified metal oxide colloidal particles are dispersed by effecting a polymerization reaction under various polymerization conditions of the polymerizable compound.

In addition, the present invention is a fine powder having an average particle diameter of 0.1 to 100 μm and containing a silane treated modified metal oxide colloidal particle characterized by being produced by bonding to the particle surface of a modified metal oxide colloidal particle, 1 to 4 silyl group(s) per 1 nm² of the surface area of the particle surface of the modified metal oxide colloidal particle which is produced by coating an outer surface of a metal oxide colloidal particle as the core with a complex oxide colloidal particle, the modified metal oxide colloidal particle being a modified metal oxide colloidal particle (C) produced by coating an outer surface of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core with a silicon dioxide-stannic oxide complex oxide colloidal particle (B) having a primary particle diameter of 1 to 4 nm in which the mass ratio of silicon dioxide/stannic oxide is 0.1 to 5.0 and an amine compound is bonded in a molar ratio of M/($SnO_2+SiO_2$) (where M is an amine compound) of 0.001 to 0.08, the modified metal oxide colloidal particle (C) having the mass ratio (B)/(A) of the complex oxide colloidal particle (B) relative to the metal oxide colloidal particle (A) being 0.05 to 0.50.

The fine powder is obtained by drying either the hydrophilic organic solvent dispersed sol of the silane treated modified metal oxide colloidal particle produced in the eighth aspect to the tenth aspect or the hydrophobic organic solvent dispersed sol in which the hydrophobic organic solvent has a solubility of water of 0.05 to 12% by mass of the silane treated modified metal oxide colloidal particle produced in the eleventh aspect to the thirteenth aspect. Drying can be performed by a publicly known method such as vacuum drying and freeze drying.

After drying, in order to adjust the average particle diameter of the obtained fine powder, the fine powder may be dry-ground.

The average particle diameter of the obtained fine powder can be measured by a method such as a laser diffraction particle size distribution measuring method.

The fine powder containing the silane treated modified metal oxide colloidal particle of the present invention has advantageous re-dispersibility in an organic solvent, so that by adding the fine powder in various hydrophilic organic solvents or a hydrophobic organic solvent having a solubility of water of 0.05 to 12% by mass and by stirring the resultant mixture, the fine powder is dispersed in an organic solvent as a particle having an average particle diameter of less than 100 nm.

Hereinafter, the present invention is more specifically described referring to Examples and Comparative Examples which should not be construed as limiting the scope of the present invention.

EXAMPLES

Hereinafter, Examples of the present invention are described. The present invention is not limited to these Examples. The measuring methods of the physical properties are shown below.

[Water content] was measured by the Karl Fischer titration method.

[Dynamic light scattering method particle diameter] was measured by a method including diluting the sol with a dispersion medium and using a parameter of the solvent with a dynamic light scattering method measuring apparatus COULTER N4PLUS (trade name; manufactured by Beckman Coulter, Inc., USA).

[Specific gravity] was measured by an areometer method.

[Viscosity] was measured using an Ostwald viscometer (20° C.).

Production Example 1

36 g of JIS No. 3 sodium silicate (containing 29.8% by mass of $SiO_2$; manufactured by Fuji Kagaku Corp.) was dissolved in 400 g of pure water and next, in the resultant solution, 9.8 g of sodium stannate $NaSnO_3 \cdot H_2O$ (containing 55.1% by mass of $SnO_2$; manufactured by Showa Kako Co., Ltd.) was dissolved. The obtained aqueous solution was passed through a column filled with a hydrogen-type cation exchange resin (Amberlite (registered trademark) IR-120B) to obtain 1,240 g of an acidic aqueous sol of a stannic oxide-silica complex colloidal particle (pH 2.4; containing 0.44% by mass of $SnO_2$ and 0.87% by mass of $SiO_2$; mass ratio $SiO_2/SnO_2$:2.0). Next, to the obtained aqueous sol, 3.2 g of diisopropylamine was added. The obtained sol was an alkaline aqueous sol of a stannic oxide-silica complex colloidal particle having pH of 8.0. In the aqueous sol, a colloidal particle having a primary particle diameter of 5 nm or less was observed under a transmission electron microscope. The molar ratio of diisopropylamine/($SnO_2+SiO_2$) was 0.15.

Production Example 2

32.8 g of JIS No. 3 sodium silicate (containing 14.7% by mass of $SiO_2$; manufactured by Fuji Kagaku Corp.) was dissolved in 178 g of pure water and next, in the resultant solution, 2.9 g of sodium stannate $NaSnO_3 \cdot H_2O$ (containing 55.7% by mass of $SnO_2$; manufactured by Showa Kako Co., Ltd.) was dissolved. The obtained aqueous solution was passed through a column filled with a hydrogen-type cation exchange resin (Amberlite IR-120B) to obtain 510 g of an acidic aqueous sol of a stannic oxide-silica complex colloidal particle (pH 2.8; containing 0.31% by mass of $SnO_2$ and 0.94% by mass of $SiO_2$; mass ratio $SiO_2/SnO_2$:3.0). Next, to the obtained aqueous sol, 1.8 g of diisopropylamine was added. The obtained sol was an alkaline aqueous sol of a stannic oxide-silica complex colloidal particle and an oligomer thereof having pH of 6.1. In the aqueous sol, a colloidal particle having a primary particle diameter of 5 nm or less was observed under a transmission electron microscope. The molar ratio of diisopropylamine/($SnO_2+SiO_2$) was 0.20.

Production Example 3

Into a 300 mL beaker, 97.6 g of pure water was charged and 17.4 g of oxalic acid dihydrate (manufactured by Ube Industries, Ltd.), 30.3 g of titanium isopropoxide (containing 8.5 g in terms of $TiO_2$; manufactured by Kanto Chemical Industry Co., Ltd.), and 67.8 g of a 25% by mass tetramethylammonium hydroxide aqueous solution (manufactured by Tama Chemicals Co., Ltd.) were added thereto while stirring. The obtained mixed solution had a molar ratio of oxalic acid/titanium atom of 1.5 and a molar ratio of tetramethylammonium hydroxide/oxalic acid of 1.33. 213.1 g of the mixed solution was retained in an open system under the atmospheric pressure at 88 to 92° C. for 3 hours and by-produced isopropanol was removed by distillation to prepare 187.5 g of a titanium-containing aqueous solution. To the obtained titanium-containing aqueous solution, 25.6 g of pure water was added to adjust the concentration in terms of $TiO_2$ of the titanium-containing aqueous solution to 4.0% by mass. The titanium-containing aqueous solution after the concentration adjustment had pH of 5.9 and a conductivity of 28.4 mS/cm. Into a 300 mL stainless steel-made autoclave vessel, 213.1 g of the above titanium-containing aqueous solution was charged and was subjected to a hydrothermal treatment at 140° C. for 5 hours. The titanium-containing aqueous solution was cooled down to room temperature and the retrieved solution after the treatment was a titanium oxide sol having high transparency. The obtained sol had a specific gravity of 1.048, pH of 4.2, a conductivity of 31.1 mS/cm, a $TiO_2$ concentration of 4.0% by mass, a tetramethylammonium hydroxide concentration of 11.9% by mass, an oxalic acid concentration of 8.8% by mass, a dynamic light scattering method particle diameter (measured by N5 (manufactured by Beckman Coulter, Inc.)) of 12 nm, and a viscosity (measured by a B-type viscometer) of 3.2 mP·s and in the obtained sol, a substantially spherical particle having a primary particle diameter of 5 nm was observed by observation under a transmission electron microscope. The obtained sol was dried at 110° C. to prepare a powder which was subjected to an X ray diffraction analysis to be confirmed to be an anatase-type crystal. The obtained anatase-type titanium oxide sol was left stand still at room temperature for one month and maintained transparency thereof without forming a precipitate.

Production Example 4

Process (a): Into a 1 m$^3$ vessel, 251.85 kg of a tetramethylammonium hydrogen carbonate (manufactured by Tama Chemicals Co., Ltd.; containing 42.4% by mass in terms of tetramethylammonium hydroxide) aqueous solution and 95.6 kg of pure water were charged to prepare a diluted aqueous solution. While stirring the aqueous solution, a zirconium oxycarbonate powder ($ZrOCO_3$; manufactured by AMR Inc.; containing 40.11% by mass as $ZrO_2$) was gradually added to the aqueous solution to be added in a total amount of 491.85 kg. After the completion of adding, the resultant reaction mixture was warmed to 85° C. and 8.23 kg of metastannic acid (manufactured by Showa Kako Corp.; containing 7.08 kg as $SnO_2$) was gradually added thereto to subject the resultant reaction mixture to warming-aging at 105° C. for 5 hours. At the time of the completion of the warming-aging, the reaction mixture was a sol. Furthermore, the reaction mixture was subjected to a hydrothermal treatment at 145° C. for 5 hours. The sol obtained after the hydrothermal treatment was a sol containing a zirconium oxide-stannic oxide complex colloidal particle and having 12.86% by mass as the ($ZrO_2$+ $SnO_2$) concentration, a specific gravity of 1.180, and pH of 10.62. Next, the sol was washed and concentrated by an ultrafiltration apparatus while adding pure water to the sol to obtain 1,040 kg of a sol containing a zirconium oxide-stannic oxide complex colloidal particle and having a concentration of 6.03% by mass, a specific gravity of 1.052, and pH of 9.43. The obtained zirconium oxide-stannic oxide complex colloid had a particle diameter observed under an electron microscope of 5 to 15 nm.

Example 1

To 830 g (containing 50 g as all the metal oxides) of the aqueous sol of the zirconium oxide-stannic oxide complex colloidal particle prepared in Production Example 4, 769 g of the alkaline aqueous sol of the silicon dioxide-stannic oxide complex colloidal particle prepared in Production Example 1 was added and the resultant reaction mixture was thoroughly stirred. Next, the reaction mixture was subjected to heating-aging at 95° C. for 2 hours to obtain 1,599 g of an aqueous sol of a modified zirconium oxide-stannic oxide complex colloidal particle coated with the silicon dioxide-stannic oxide complex colloidal particle. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to obtain 1,980 g of an acidic aqueous sol of the modified zirconium oxide-stannic oxide complex colloidal particle. The obtained sol had pH of 2.7 and the concentration of all the metal oxides of 3.0% by mass. To the obtained acidic sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain a methanol sol of the modified zirconium oxide-stannic oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 6 g of methyltrimethoxysilane (trade name: LS-530; manufactured by Shin-Etsu Chemical Co., Ltd.) was added and the resultant reaction mixture was subjected to reflux-heating for 5 hours to silylate the sol to bond a methyldimethoxysilyl group to the surface of the modified zirconium oxide-stannic oxide colloidal particle. Next, while adding methyl ethyl ketone to the resultant reaction mixture using an evaporator under 80 Torr, methanol was distilled off to exchange methanol for methyl ethyl ketone to obtain a methyl ethyl ketone sol of the modified zirconium oxide-stannic oxide colloidal particle in which diisobutylamine and a methyldimethoxysilyl group were bonded to the surface thereof. The obtained sol had a specific gravity of 1.084, a viscosity of 1.0 mPa·s, a concentration of all the metal oxides of 30.6% by mass, a primary particle diameter measured by observation under a transmission electron microscope of 5 to 10 nm, and a dynamic light scattering method particle diameter of 10 nm. The molar ratio of diisobutylamine/($SnO_2$+ $SiO_2$) was 0.030 and the number of silyl groups bonded to the surface of the modified zirconium oxide-stannic oxide colloidal particle was 2.1 per 1 nm$^2$ of the surface area.

Example 2

1,000 g (containing 40 g as all the metal oxides) of the aqueous sol of the titanium oxide colloidal particle prepared in Production Example 3 was washed by water-flushing using an ultrafiltration membrane to remove an electrolyte and 960 g of the alkaline aqueous sol of the silicon dioxide-stannic oxide complex colloidal particle prepared in Production Example 1 was added thereto, followed by thoroughly stirring the resultant reaction mixture. Next, the reaction mixture was subjected to heating-aging at 95° C. for 2 hours to obtain 1, 920 g of an aqueous sol of a modified titanium oxide colloidal particle coated with the silicon dioxide-stannic oxide complex colloidal particle. The obtained sol had pH of 8.3 and a concentration of all the metal oxides of 3.7% by mass. The obtained aqueous sol of the modified titanium oxide complex colloidal particle was passed through a column filled with a hydrogen-type cation exchange resin (Amberlite IR-120B) to obtain 1,980 g of an acidic aqueous sol of the modified titanium oxide complex colloidal particle. The obtained sol had pH of 2.7 and a concentration of all the metal oxides of 3.0% by mass. To the obtained sol, 0.5 g of diisobutylamine was added to bond diisobutylamine to the surface of the modified titanium oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain a methanol sol of the modified titanium oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 6 g of methyltrimethoxysilane (trade name: LS-530; manufactured by Shin-Etsu Chemical Co., Ltd.) was added and the resultant reaction mixture was subjected to reflux-heating for 5 hours to silylate the sol to bond a methyldimethoxysilyl group to the surface of the modified titanium oxide colloidal particle. Next, while adding methyl ethyl ketone to the resultant reaction mixture using an evaporator under 80 Torr, methanol was distilled off to exchange methanol for methyl ethyl ketone to obtain a methyl ethyl ketone sol of the modified titanium oxide colloidal particle in which diisobutylamine and a methyldimethoxysilyl group were bonded to the surface thereof. The obtained sol had a specific gravity of 1.084, a viscosity of 1.0 mPa·s, a concentration of all the metal oxides of 30.6% by mass, a primary particle diameter measured by observation under a transmission electron microscope of 5 to 10 nm, and a dynamic light scattering method particle diameter of 10 nm. The molar ratio of diisobutylamine/($SnO_2$+$SiO_2$) was 0.024 and the number of silyl groups bonded to the surface of the modified titanium oxide colloidal particle was 2.1 per 1 $nm^2$ of the surface area.

Example 3

1,000 g (containing 40 g as all the metal oxides) of the aqueous sol of the titanium oxide colloidal particle (A) prepared in Production Example 3 was washed by water-flushing using an ultrafiltration membrane to remove an electrolyte and 923.1 g of the alkaline aqueous sol of the stannic oxide-silica colloidal particle and an oligomer thereof prepared in Production Example 1 were added thereto, followed by thoroughly stirring the resultant reaction mixture. Next, the reaction mixture was subjected to heating-aging at 95° C. for 2 hours to obtain 1, 923.1 g of an aqueous sol of a modified titanium oxide colloidal particle coated with the stannic oxide-silica complex colloidal particle and the oligomer thereof. The obtained sol had pH of 10.4 and a concentration of all the metal oxides of 2.7% by mass. The obtained aqueous sol of the modified titanium oxide complex colloidal particle was passed through a column filled with a hydrogen-type cation exchange resin (Amberlite IR-120B) to obtain 2,080 g of an acidic aqueous sol of the modified titanium oxide complex colloidal particle. The obtained sol had pH of 2.7 and a concentration of all the metal oxides of 2.5% by mass. To the obtained sol, 0.5 g of diisobutylamine was added to bond diisobutylamine to the surface of the modified titanium oxide colloidal particle. The sol at this time had pH of 3.0. Next, the obtained sol was charged into an evaporator equipped with an eggplant-shaped flask to be concentrated and while adding methanol to the sol, water was distilled off from the sol under 600 Torr to obtain 253.7 g of a methanol sol of the modified titanium oxide colloidal particle to which diisobutylamine was bonded. The obtained methanol sol had a specific gravity of 0.949, a viscosity of 1.2 mPa·s, pH of 4.6 (measured after diluting the sol with water having the same mass as that of the sol), a concentration of all the metal oxides of 20.5% by mass, and a water content of 0.3%. To 126.9 g of the obtained methanol sol, 3.8 g of phenyltrimethoxysilane (trade name: KBM-103; manufactured by Shin-Etsu Chemical Co., Ltd.) was added and the resultant reaction mixture was subjected to reflux-heating for 5 hours to silylate the sol to bond a phenyldimethoxysilyl group to the surface of the modified titanium oxide colloidal particle. Next, while adding propylene glycol monomethyl ether to the resultant reaction mixture using an evaporator under 100 Torr, methanol was distilled off to exchange methanol for propylene glycol monomethyl ether to obtain 247.7 g of a propylene glycol monomethyl ether sol of the modified titanium oxide colloidal particle in which diisobutylamine and a phenyldimethoxysilyl group were bonded to the surface thereof. The obtained sol had a specific gravity of 0.982, a viscosity of 2.0 mPa·s, a concentration of all the metal oxides of 10.5% by mass, a primary particle diameter measured by observation under a transmission electron microscope of 5 to 10 nm, and a dynamic light scattering method particle diameter of 11 nm. The molar ratio of diisobutylamine/($SnO_2$+$SiO_2$) was 0.024 and the number of silyl groups bonded to the surface of the surface-modified titanium oxide colloidal particle was 1.2 per 1 $nm^2$ of the surface area.

Example 4

1,000 g (containing 40 g as all the metal oxides) of the aqueous sol of the titanium oxide colloidal particle (A) prepared in Production Example 3 was washed by water-flushing using an ultrafiltration membrane to remove an electrolyte and 923.1 g of the alkaline aqueous sol of the stannic oxide-silica colloidal particle and an oligomer thereof prepared in Production Example 1 were added thereto, followed by thoroughly stirring the resultant reaction mixture. Next, the reaction mixture was subjected to heating-aging at 95° C. for 2 hours to obtain 1, 923.1 g of an aqueous sol of the modified titanium oxide colloidal particle coated with the stannic oxide-silica complex colloidal particle and the oligomer thereof. The obtained sol had pH of 10.4 and a concentration of all the metal oxides of 3.0% by mass. The obtained aqueous sol of the modified titanium oxide complex colloidal particle was passed through a column filled with a hydrogen-type cation exchange resin (Amberlite IR-120B) to obtain 1,923.1 g of an acidic aqueous sol of the modified titanium oxide complex colloidal particle. The obtained sol had pH of 2.7 and a concentration of all the metal oxides of 2.7% by mass. To the obtained sol, 0.5 g of diisobutylamine was added to bond diisobutylamine to the surface of the modified titanium oxide colloidal particle. The sol at this time had pH of 3.0. Next, the obtained sol was charged into an evaporator equipped with an eggplant-shaped flask to be concentrated and while adding methanol to the sol, water was distilled off from the sol under 600 Torr to obtain 253.7 g of a methanol sol of the modified titanium oxide colloidal particle to which diisobutylamine was bonded. The obtained methanol sol had a specific gravity of 0.949, a viscosity of 1.2 mPa·s, pH of 4.6 (measured after diluting the sol with water having the same mass as that of the sol), a concentration of all the metal oxides of 20.5% by mass, and a water content of 0.3%. To 126.9 of the obtained methanol sol, 3.8 g of phenyltrimethoxysilane (trade name: KBM-103; manufactured by Shin-Etsu Chemical Co., Ltd.) was added and the resultant reaction mixture was subjected to reflux-heating for 5 hours. Furthermore, to the resultant reaction mixture, 5.2 g of hexamethylenedisilazane (trade name: LS-7150; manufactured by Shin-Etsu Chemical Co., Ltd.) was added and the resultant reaction mixture was subjected to reflux-heating for 3 hours to bond a phenyldimethoxysilyl group and a trimethylsilyl group to the surface of the modified titanium oxide colloidal particle. Next, while adding propylene glycol monomethyl ether to the resultant reaction mixture using an evaporator under 80 Torr, methanol was distilled off to exchange methanol for propylene glycol monomethyl ether to obtain 252.6 g of a propylene glycol monomethyl ether sol of the modified titanium oxide colloidal particle in which diisobutylamine, a phenyldimethoxysilyl group, and a trimethylsilyl group were bonded to the surface thereof. The obtained sol had a specific gravity of 0.980, a viscosity of 2.5 mPa·s, a concentration of all the metal oxides of 10.3% by mass, a primary particle diameter measured by observation under a transmission electron microscope of 5 to 10 nm, and a dynamic light scattering method particle diameter of 21 nm. The molar ratio of diisobutylamine/($SnO_2$+$SiO_2$) was 0.024 and the number of silyl groups bonded to the surface of the surface-modified titanium oxide colloidal particle was 4.0 per 1 $nm^2$ of the surface area.

Example 5

To 830 g (containing 50 g as all the metal oxides) of the aqueous sol of the zirconium oxide-stannic oxide complex colloidal particle (A) prepared in Production Example 4, 769 g of the alkaline aqueous sol of the stannic oxide-silica colloidal particle and an oligomer thereof prepared in Production Example 1 was added and the resultant reaction mixture was thoroughly stirred. Next, the reaction mixture was subjected to heating-aging at 95° C. for 2 hours to obtain 1,599 g of an aqueous sol of the modified zirconium oxide-stannic oxide colloidal particle coated with the stannic oxide-silica complex colloidal particle and the oligomer thereof. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to recover the aqueous sol using pure water to obtain 1,980 g of an acidic aqueous sol of the modified zirconium oxide-stannic oxide complex colloidal particle. The obtained sol had pH of 2.7 and a concentration of all the metal oxides of 3.0% by mass. To the obtained sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain 285.7 g of a methanol sol of the modified zirconium oxide-stannic oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 15.7 g of decyltrimethoxysilane (trade name: KBM-3103C; manufactured by Shin-Etsu Chemical Co., Ltd.) was added and the resultant reaction mixture was subjected to reflux-heating for 5 hours. Furthermore, to the resultant reaction mixture, 1.8 g of hexamethyldisilazane (trade name: LS-7150; manufactured by Shin-Etsu Chemical Co., Ltd.) was added and the resultant reaction mixture was subjected to reflux-heating for 5 hours to bond a decyldimethoxy group and a trimethyl group to the surface of the modified titanium oxide colloidal particle. Next, while adding toluene to the resultant reaction mixture using an evaporator under 110 Torr, methanol was distilled off to exchange methanol for toluene to obtain 196 g of a toluene sol of the modified zirconium oxide-stannic oxide colloidal particle in which diisobutylamine, a decyltrimethoxysilyl group, and a trimethylsilyl group were bonded to the surface thereof. The obtained sol had a specific gravity of 1.122, a viscosity of 1.3 mPa·s, a concentration of all the metal oxides of 30.6% by mass, a primary particle diameter measured by observation under a transmission electron microscope of 5 to 10 nm, and a dynamic light scattering method particle diameter of 31 nm. The molar ratio of diisobutylamine/($SnO_2$+$SiO_2$) was 0.030 and the number of silyl groups bonded to the surface of the surface-modified zirconium oxide-stannic oxide colloidal particle was 4.0 per 1 $nm^2$ of the surface area.

Example 6

To 830 g (containing 50 g as all the metal oxides) of the aqueous sol of the zirconium oxide-stannic oxide complex colloidal particle (A) prepared in Production Example 4, 769 g of the alkaline aqueous sol of the stannic oxide-silica colloidal particle and an oligomer thereof prepared in Production Example 1 was added and the resultant reaction mixture was thoroughly stirred. Next, the reaction mixture was subjected to heating-aging at 95° C. for 2 hours to obtain 1,599 g of an aqueous sol of the modified zirconium oxide-stannic oxide colloidal particle coated with the stannic oxide-silica complex colloidal particle and the oligomer thereof. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to recover the aqueous sol using pure water to obtain 1,980 g of an acidic aqueous sol of the modified zirconium oxide-stannic oxide complex colloidal particle. The obtained sol had pH of 2.7 and a concentration of all the metal oxides of 3.0% by mass. To the obtained sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain 285.7 g of a methanol sol of the modified zirconium oxide-stannic oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 6.7 g of styryltrimethoxysilane (trade name: KBM-1403; manufactured by Shin-Etsu Chemical Co., Ltd.) was added and the resultant reaction mixture was subjected to reflux-heating for 5 hours to silylate the sol to bond a styryldimethoxysilyl group to the surface of the modified zirconium oxide-stannic oxide colloidal particle. Next, while adding methyl ethyl ketone to the resultant reaction mixture using an evaporator under 80 Torr, methanol was distilled off to exchange methanol for methyl ethyl ketone to obtain 200 g of a methyl ethyl ketone sol of the modified zirconium oxide-stannic oxide colloidal particle in which diisobutylamine and a styryldimethoxysilyl group were bonded to the surface thereof. The obtained sol had a specific gravity of 1.095, a viscosity of 3.1 mPa·s, a concentration of all the metal oxides of 30.0% by mass, a primary particle diameter measured by observation under a transmission electron microscope of 5 to 10 nm, and a dynamic light scattering method particle diameter of 10 nm. The molar ratio of diisobutylamine/($SnO_2$+$SiO_2$) was 0.030 and the number of silyl groups bonded to the surface of the surface-modified zirconium oxide-stannic oxide colloidal particle was 1.5 per 1 $nm^2$ of the surface area.

Example 7

To 830 g (containing 50 g as all the metal oxides) of the aqueous sol of the zirconium oxide-stannic oxide complex colloidal particle (A) prepared in Production Example 4, 769 g of the alkaline aqueous sol of the stannic oxide-silica colloidal particle and an oligomer thereof prepared in Production Example 1 was added and the resultant reaction mixture was thoroughly stirred. Next, the reaction mixture was subjected to heating-aging at 95° C. for 2 hours to obtain 1,599 g of an aqueous sol of the modified zirconium oxide-stannic oxide colloidal particle coated with the stannic oxide-silica complex colloidal particle and the oligomer thereof. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to recover the aqueous sol using pure water to obtain 1,980 g of an acidic aqueous sol of the modified zirconium oxide-stannic oxide complex colloidal particle. The obtained sol had pH of 2.7 and a concentration of all the metal oxides of 3.0% by mass. To the obtained sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain 285.7 g of a methanol sol of the modified zirconium oxide-stannic oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 13.4 g of styryltrimethoxysilane (trade name: KBM-1403; manufactured by Shin-Etsu Chemical Co., Ltd.) was added and the resultant reaction mixture was subjected to reflux-heating for 5 hours to silylate the sol to bond a styryldimethoxysilyl group to the surface of the modified zirconium oxide-stannic oxide colloidal particle. Next, while adding methyl ethyl ketone to the resultant reaction mixture using an evaporator under 80 Torr, methanol was distilled off to exchange methanol for methyl ethyl ketone to obtain 200 g of a methyl ethyl ketone sol of the modified zirconium oxide-stannic oxide colloidal particle in which diisobutylamine and a styryldimethoxysilyl group were bonded to the surface thereof. The obtained sol had a specific gravity of 1.095, a viscosity of 3.5 mPa·s, a concentration of all the metal oxides of 30.0% by mass, a primary particle diameter measured by observation under a transmission electron microscope of 5 to 10 nm, and a dynamic light scattering method particle diameter of 10 nm. The molar ratio of diisobutylamine/($SnO_2$+$SiO_2$) was 0.030 and the number of silyl groups bonded to the surface of the surface-modified zirconium oxide-stannic oxide colloidal particle was 3.0 per 1 $nm^2$ of the surface area.

Example 8

To 830 g (containing 50 g as all the metal oxides) of the aqueous sol of the zirconium oxide-stannic oxide complex colloidal particle (A) prepared in Production Example 4, 769 g of the alkaline aqueous sol of the stannic oxide-silica colloidal particle and an oligomer thereof prepared in Production Example 1 was added and the resultant reaction mixture was thoroughly stirred. Next, the reaction mixture was subjected to heating-aging at 95° C. for 2 hours to obtain 1,599 g of an aqueous sol of the modified zirconium oxide-stannic oxide colloidal particle coated with the stannic oxide-silica complex colloidal particle and the oligomer thereof. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to recover the aqueous sol using pure water to obtain 1,980 g of an acidic aqueous sol of the modified zirconium oxide-stannic oxide complex colloidal particle. The obtained sol had pH of 2.7 and a concentration of all the metal oxides of 3.0% by mass. To the obtained sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain 285.7 g of a methanol sol of the modified zirconium oxide-stannic oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 5.9 g of phenyltrimethoxysilane (trade name: LS-7150; manufactured by Shin-Etsu Chemical Co., Ltd.) was added and the resultant reaction mixture was subjected to reflux-heating for 5 hours to silylate the sol to bond a phenyldimethoxysilyl group to the surface of the modified zirconium oxide-stannic oxide colloidal particle. Next, while adding methyl ethyl ketone to the resultant reaction mixture using an evaporator under 80 Torr, methanol was distilled off to exchange methanol for methyl ethyl ketone to obtain 200 g of a methyl ethyl ketone sol of the modified zirconium oxide-stannic oxide colloidal particle in which diisobutylamine and a phenyldimethoxysilyl group were bonded to the surface thereof. The obtained sol had a specific gravity of 1.095, a viscosity of 3.3 mPa·s, a concentration of all the metal oxides of 30.0% by mass, a primary particle diameter measured by observation under a transmission electron microscope of 5 to 10 nm, and a dynamic light scattering method particle diameter of 11 nm. The molar ratio of diisobutylamine/($SnO_2$+$SiO_2$) was 0.030 and the number of silyl groups bonded to the surface of the surface-modified zirconium oxide-stannic oxide colloidal particle was 1.5 per 1 $nm^2$ of the surface area.

Example 9

To 830 g (containing 50 g as all the metal oxides) of the aqueous sol of the zirconium oxide-stannic oxide complex colloidal particle (A) prepared in Production Example 4, 769 g of the alkaline aqueous sol of the stannic oxide-silica colloidal particle and an oligomer thereof prepared in Production Example 1 was added and the resultant reaction mixture was thoroughly stirred. Next, the reaction mixture was subjected to heating-aging at 95° C. for 2 hours to obtain 1,599 g of an aqueous sol of the modified zirconium oxide-stannic oxide colloidal particle coated with the stannic oxide-silica complex colloidal particle and the oligomer thereof. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to recover the aqueous sol using pure water to obtain 1,980 g of an acidic aqueous sol of the modified zirconium oxide-stannic oxide complex colloidal particle. The obtained sol had pH of 2.7 and a concentration of all the metal oxides of 3.0% by mass. To the obtained sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain 285.7 g of a methanol sol of the modified zirconium oxide-stannic oxide colloidal particle to which diisobutylamine was bonded. The obtained methanol sol had a specific gravity of 0.961, a viscosity of 1.0 mP·s, pH of 4.9 (measured after diluting the sol with water having the same mass as that of the sol), a concentration of all the metal oxides of 21% by mass, and a water content of 2.3%. To the obtained methanol sol, 11.8 g of phenyltrimethoxysilane (trade name: LS-7150; manufactured by Shin-Etsu Chemical Co., Ltd.) was added and the resultant reaction mixture was subjected to reflux-heating for 5 hours to silylate the sol to bond a phenyldimethoxy group to the surface of the modified zirconium oxide-stannic oxide colloidal particle. Next, while adding methyl ethyl ketone to the resultant reaction mixture using an evaporator under 80 Torr, methanol was distilled off to exchange methanol for methyl ethyl ketone to obtain 200 g of a methyl ethyl ketone sol of the modified zirconium oxide-stannic oxide colloidal particle in which diisobutylamine and a phenyldimethoxysilyl group were bonded to the surface thereof. The obtained sol had a specific gravity of 1.095, a viscosity of 3.6 mPa·s, a concentration of all the metal oxides of 30.0% by mass, a primary particle diameter measured by observation under a transmission electron microscope of 5 to 10 nm, and a dynamic light scattering method particle diameter of 9 nm. The molar ratio of diisobutylamine/($SnO_2$+$SiO_2$) was 0.030 and the number of silyl groups bonded to the surface of the surface-modified zirconium oxide-stannic oxide colloidal particle was 3.0 per 1 $nm^2$ of the surface area.

Example 10

To 830 g (containing 50 g as all the metal oxides) of the aqueous sol of the zirconium oxide-stannic oxide complex colloidal particle prepared in Production Example 4,769 g of the alkaline aqueous sol of the silicon dioxide-stannic oxide complex colloidal particle prepared in Production Example 1 was added and the resultant reaction mixture was thoroughly stirred. Next, the reaction mixture was subjected to heating-aging at 95° C. for 2 hours to obtain 1,599 g of an aqueous sol of the modified zirconium oxide-stannic oxide complex colloidal particle coated with the silicon dioxide-stannic oxide complex colloidal particle. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to obtain 1,980 g of an acidic aqueous sol of the modified zirconium oxide-stannic oxide complex colloidal particle. The obtained sol had pH of 2.7 and a concentration of all the metal oxides of 3.0% by mass. To the obtained acidic sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain a methanol sol of the modified zirconium oxide-stannic oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 4.45 g of dimethyldimethoxysilane (trade name: KBM-22; manufactured by Shin-Etsu Chemical Co., Ltd.) and 16.6 g of 1-propanol were added and the resultant reaction mixture was subjected to reflux-heating for 5 hours to silylate the sol to bond a dimethyldimethoxysilyl group to the surface of the modified zirconium oxide-stannic oxide colloidal particle. Next, while adding methyl ethyl ketone to the resultant reaction mixture using an evaporator under 110 Torr, methanol was distilled off to exchange methanol for methyl ethyl ketone to obtain a methyl ethyl ketone sol of the modified zirconium oxide-stannic oxide colloidal particle in which diisobutylamine and a dimethylethoxysilyl group were bonded to the surface thereof. The obtained sol had a specific gravity of 1.080, a viscosity of 1.7 mPa·s, a concentration of all the metal oxides of 30.6% by mass, a primary particle diameter measured by observation under a transmission electron microscope of 5 to 10 nm, and a dynamic light scattering method particle diameter of 46 nm. The molar ratio of diisobutylamine/($SnO_2$+$SiO_2$) was 0.030 and the number of silyl groups bonded to the surface of the surface-modified zirconium oxide-stannic oxide colloidal particle was 1.2 per 1 $nm^2$ of the surface area.

Example 11

To 830 g (containing 50 g as all the metal oxides) of the aqueous sol of the zirconium oxide-stannic oxide complex colloidal particle prepared in Production Example 4,769 g of the alkaline aqueous sol of the silicon dioxide-stannic oxide complex colloidal particle prepared in Production Example 1 was added and the resultant reaction mixture was thoroughly stirred. Next, the reaction mixture was subjected to heating-aging at 95° C. for 2 hours to obtain 1,599 g of an aqueous sol of the modified zirconium oxide-stannic oxide complex colloidal particle coated with the silicon dioxide-stannic oxide complex colloidal particle. The obtained sol had pH of 8.3 and a concentration of all the metal oxides of 3.7% by mass. The obtained aqueous sol of the modified zirconium oxide-stannic oxide complex colloidal particle was passed through a column filled with a hydrogen-type cation exchange resin (Amberlite IR-120B) to obtain 1,980 g of an acidic aqueous sol of the modified zirconium oxide-stannic oxide complex colloidal particle. The obtained sol had pH of 2.7 and a concentration of all the metal oxides of 3.0% by mass. To the obtained acidic sol, 0.5 g of diisobutylamine was added to bond diisobutylamine to the surface of the modified zirconium oxide-stannic oxide colloidal particle. The sol at this time had pH of 4.3. Next, the obtained sol was concentrated to 20% by mass of the concentration of all the metal oxides using an ultrafiltration apparatus. The sol after the concentration had a specific gravity of 1.211 and pH of 3.7. The concentrated aqueous sol was charged into an evaporator equipped with an eggplant-shaped flask and while adding methanol to the sol, water was distilled off from the sol under 600 Torr to obtain a methanol sol of the modified zirconium oxide-stannic oxide colloidal particle to which diisobutylamine was bonded. The obtained methanol sol had a specific gravity of 0.961, a viscosity of 1.0 mPa·s, pH of 4.9 (measured after diluting the sol with water having the same mass as that of the sol), a concentration of all the metal oxides of 21% by mass, and a water content of 2.3%. To the obtained methanol sol, 5.0 g of methacryloxypropyltrimethoxysilane (trade name: KBM-503; manufactured by Shin-Etsu Chemical Co., Ltd.) and 17.2 g of 1-propanol were added and the resultant reaction mixture was subjected to reflux-heating for 5 hours to silylate the sol to bond a methacryloxypropyltrimethoxysilyl group to the surface of the modified zirconium oxide-stannic oxide colloidal particle. Next, while adding methyl ethyl ketone to the resultant reaction mixture using an evaporator under 110 Torr, methanol was distilled off to exchange methanol for methyl ethyl ketone to obtain a methyl ethyl ketone sol of the modified zirconium oxide-stannic oxide colloidal particle in which diisobutylamine and a methacryloxypropyldimethoxysilyl group were bonded to the surface thereof. The obtained sol had a specific gravity of 1.088, a viscosity of 0.9 mPa·s, a concentration of all the metal oxides of 30.3% by mass, a primary particle diameter measured by observation under a transmission electron microscope of 5 to 10 nm, and a dynamic light scattering method particle diameter of 8.6 nm. The molar ratio of diisobutylamine/($SnO_2$+$SiO_2$) was 0.030 and the number of silyl groups bonded to the surface of the surface-modified zirconium oxide-stannic oxide colloidal particle was 1.0 per 1 $nm^2$ of the surface area.

Example 12

50 g of the methyl ethyl ketone sol of the modified zirconium oxide-stannic oxide colloidal particle in which diisobutylamine and a methyldimethoxysilyl group were bonded to the surface thereof obtained in Example 1 was put in a glass petri dish and was dried by a vacuum drier for 3 hours to obtain about 15 g of a fine powder. The average particle diameter of the fine powder was measured using a laser diffraction particle size distribution measuring apparatus and was 8 μm. 10 g of the fine powder was charged into a glass beaker and 40 g of methyl ethyl ketone was added thereto, followed by stirring the resultant mixture by a stirrer for 1 hour. The fine powder was dispersed in methyl ethyl ketone to become a transparent sol.

Comparative Example 1

A modified stannic oxide-zirconium oxide complex colloidal particle having a particle diameter of 4.5 to 60 nm formed by coating with the tungsten oxide-stannic oxide-silicon dioxide complex colloidal particle described in Patent Document 2 was passed through a column filled with a hydrogen-type cation exchange resin (Amberlite IR-120B) to obtain 1,220 g of an acidic aqueous sol of the modified zirconium oxide-stannic oxide complex colloidal particle. The obtained sol had pH of 2.9 and a concentration of all the metal oxides of 3.9% by mass. To the obtained sol, 0.2 g of diisobutylamine was added to bond diisobutylamine to the surface of the acidic modified zirconium oxide-stannic oxide complex colloidal particle. The sol at this time had pH of 4.2. Next, the obtained sol was concentrated to 20% by mass of the concentration of all the metal oxides using an ultrafiltration apparatus. The sol after the concentration had a specific gravity of 1.116 and pH of 2.8. The concentrated aqueous sol was subjected to methanol-exchange in the same manner as in Example 1. The obtained methanol sol had a specific gravity of 0.950, a viscosity of 8.1 mPa·s, pH of 3.8 (measured after diluting the sol with water having the same mass as that of the sol), a concentration of all the metal oxides of 20% by mass, and a water content of 1.4%. To the obtained methanol sol, 4.8 g of methyltrimethoxysilane (trade name: LS-530; manufactured by Shin-Etsu Chemical Co., Ltd.) was added and the resultant reaction mixture was subjected to reflux-heating for 5 hours to silylate the sol to bond a methyldimethoxysilyl group to the surface of the modified zirconium oxide-stannic oxide complex colloidal particle. Next, while adding methyl ethyl ketone to the resultant reaction mixture using an evaporator under 80 Torr, methanol was distilled off in an attempt to exchange methanol for methyl ethyl ketone. However, the viscosity of the reaction mixture was gradually elevated and while maintaining transparency, the reaction mixture was gelled, so that a methyl ethyl ketone sol could not be obtained.

Comparative Example 2

The methanol-exchange was performed in the same manner as in Example 1 except that diisobutylamine was not added to the acidic aqueous sol of the modified zirconium oxide-stannic oxide complex colloidal particle. However, in the process of the exchange for methanol, the sol was gelled, so that a methyl ethyl ketone sol could not be obtained.

Comparative Example 3

The methanol-exchange was performed in the same manner as in Example 1 except that methyltrimethoxysilane was not added to the methanol sol of the modified zirconium oxide-stannic oxide complex colloidal particle to which diisobutylamine was bonded. However, in the process of the exchange for methyl ethyl ketone, the sol was gelled, so that a methyl ethyl ketone sol could not be obtained.

Comparative Example 4

While adding methanol to the aqueous sol of the modified zirconium oxide-stannic oxide colloidal particle prepared in the same manner as in Example 1 except that diisobutylamine was not added, water was distilled off from the sol using an evaporator under 600 Torr to exchange the sol for methanol. However, the appearance of the sol became whitish and the modified zirconium oxide-stannic oxide colloidal particles were agglomerated, so that a methanol sol could not be obtained.

The invention claimed is:
1. A silane treated modified metal oxide colloidal particle comprising being produced by bonding to the particle surface of a modified metal oxide colloidal particle, 1 to 4 silyl group(s) per 1 $nm^2$ of the surface area of the particle surface of the modified metal oxide colloidal particle, which is produced by coating an outer surface of a metal oxide colloidal particle as the core with a complex oxide colloidal particle, the modified metal oxide colloidal particle being a modified metal oxide colloidal particle (C) produced by coating an outer surface of a colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm as the core with a silicon dioxide-stannic oxide complex oxide colloidal particle (B) having a primary particle diameter of 1 to 4 nm, in which the mass ratio of silicon dioxide/stannic oxide is 0.1 to 5.0, and an amine compound is bonded in a molar ratio of M/(SnO$_2$+SiO$_2$), wherein M is an amine compound, of 0.001 to 0.08, the modified metal oxide colloidal particle (C) having the mass ratio (B)/(A) of the complex oxide colloidal particle (B) relative to the metal oxide colloidal particle (A) being 0.05 to 0.50.

2. The silane treated modified metal oxide colloidal particle according to claim 1, wherein the silyl group is a group of Formula (I) below:

—Si(R$^1$)$_a$(X)$_{3-a}$     Formula (I)

wherein R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group;

X is a hydroxy group or a C$_{1-4}$ alkoxy group; and a is an integer of 0 to 3.

3. The silane treated modified metal oxide colloidal particle according to claim 1, wherein the amine compound is at least one of compound selected from the group consisting of a primary amine, a secondary amine, and a tertiary amine.

4. A hydrophilic organic solvent dispersed sol of the silane treated modified metal oxide colloidal particle according to claim 1.

5. The hydrophilic organic solvent dispersed sol of the silane treated modified metal oxide colloidal particle according to claim 4, wherein the hydrophilic organic solvent is at least one selected from the group consisting of methyl alcohol, ethyl alcohol, isopropyl alcohol, dimethylformamide, ethylcellosolve, butylcellosolve, ethylene glycol, and propylene glycol monomethyl ether.

6. A production method of the hydrophilic organic solvent dispersed sol of the silane treated modified metal oxide colloidal particle according to claim 4, the production method comprising processes (a), (b), (c), (d), (e), and (f) below:

a process (a): preparing an aqueous solution containing an alkali stannate and an alkali silicate in such amounts that the mass ratio of silicon dioxide/stannic oxide becomes 0.1 to 5; removing cations existing in the aqueous solution to prepare an aqueous sol of a silicon dioxide-stannic oxide complex colloidal particle having a primary particle diameter of 1 to 4 nm; and adding to the aqueous sol, an amine compound in an amount so that the molar ratio of M/(SnO$_2$+SiO$_2$), wherein M is an amine compound, becomes 0.1 to 1.0 to obtain an aqueous sol of a silicon dioxide-stannic oxide complex oxide colloidal particle (B') having a mass ratio of silicon dioxide/stannic oxide of 0.1 to 5.0, having a primary particle diameter of 1 to 4 nm, and stabilized by the amine compound existing in a molar ratio of M/(SnO$_2$+SiO$_2$), wherein M is an amine compound, of 0.1 to 1.0;

a process (b): mixing an aqueous sol of the colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm and the aqueous sol obtained in the process (a) in such amounts that the mass ratio (B')/(A) of the silicon dioxide-stannic oxide complex oxide colloidal particle (B') relative to the metal oxide colloidal particle (A) becomes 0.05 to 0.50 to obtain an aqueous sol of a modified metal oxide colloidal particle (C') produced by coating the metal oxide colloidal particle (A) with the silicon dioxide-stannic oxide complex oxide colloidal particle (B');

a process (c): cation-exchanging the aqueous sol of the modified metal oxide colloidal particle (C') obtained in the process (b) to remove the amine compound added in the process (a);

a process (d): adding to the aqueous sol obtained in the process (c), an amine compound in such an amount that the molar ratio of M/(SnO$_2$+SiO$_2$), wherein M is an amine compound, of the amine compound relative to the silicon dioxide-stannic oxide complex oxide colloidal particle (B') becomes 0.001 to 0.08 to obtain an aqueous sol of the modified metal oxide colloidal particle (C) produced by coating an outer surface of the oxide colloidal particle (A) as the core with the silicon dioxide-stannic oxide complex oxide colloidal particle (B) having a primary particle diameter of 1 to 4 nm, in which the mass ratio of silicon dioxide/stannic oxide is 0.1 to 5.0, and an amine compound is bonded in a molar ratio of M/(SnO$_2$+SiO$_2$), wherein M is an amine compound, of 0.001 to 0.08, the modified metal oxide colloidal particle (C) having the mass ratio (B)/(A) of the silicon dioxide-stannic oxide complex oxide colloidal particle (B) relative to the metal oxide colloidal particle (A) being 0.05 to 0.50;

a process (e): exchanging a dispersion medium of the aqueous sol obtained in the process (d) for a hydrophilic organic solvent; and a process (f): adding to the hydrophilic organic solvent dispersed sol obtained in the process (e), at least one of compound selected from the group consisting of an organic silicon compound of General Formula (II) below:

Si(R$^1$)$_a$(X)$_{4-a}$     General Formula (II)

wherein R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group;

X is a hydroxy group or a C$_{1-4}$ alkoxy group; and a is an integer of 0 to 3, a hydrolysis product thereof, and an organic silicon compound of General Formula (III) below:

(R$^1$$_3$Si)$_2$NH     General Formula (III)

wherein R$^1$ is a C$_{1-12}$ substituted or unsubstituted alkyl group or halogenated alkyl group, a C$_{2-12}$ substituted or unsubstituted alkenyl group, a C$_{6-12}$ substituted or unsubstituted aryl group or halogenated aryl group, an epoxy group, an acryloyl group, a methacryloyl group, a methacryloxyalkyl group, a mercapto group, an amino group, or a cyano group so that the mass ratio of the organic silicon compound relative to the modified metal oxide colloidal particle (C) becomes 0.01 to 0.50 to bond a silyl group of General Formula (I):

—Si(R$^1$)$_a$(X)$_{3-a}$     Formula (I)

wherein R$^1$ is a C$_{1-12}$ substituted or unsubstituted alkyl group or halogenated alkyl group, a C$_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group;

X is a hydroxy group or a $C_{1-4}$ alkoxy group; and a is an integer of 0 to 3, to the surface of the modified metal oxide colloidal particle (C).

7. The production method of the hydrophilic organic solvent dispersed sol of the silane treated modified metal oxide colloidal particle according to claim 6, wherein at least one of compound selected from the group consisting of a primary amine, a secondary amine, and a tertiary amine is used as the amine compound.

8. The production method of the hydrophilic organic solvent dispersed sol of the silane treated modified metal oxide colloidal particle according to claim 6, wherein at least one selected from the group consisting of methyl alcohol, ethyl alcohol, isopropyl alcohol, dimethylformamide, ethylcellosolve, butylcellosolve, ethylene glycol, and propylene glycol monomethyl ether is used as the hydrophilic organic solvent.

9. The production method of the hydrophilic organic solvent dispersed sol according to claim 8, wherein at least one selected from the group consisting of a primary amine, a secondary amine, and a tertiary amine is used as the amine compound.

10. A hydrophobic organic solvent dispersed sol in which the hydrophobic organic solvent has a solubility of water of 0.05 to 12% by mass containing the silane treated modified metal oxide colloidal particle according to claim 1.

11. The hydrophobic organic solvent dispersed sol according to claim 10, wherein the hydrophobic organic solvent is at least one selected from the group consisting of 1-pentanol, methyl ethyl ketone, methyl isobutyl ketone, cyclohexanone, hexane, ethyl acetate, butyl acetate, methyl methacrylate, diisopropyl ether, and toluene.

12. A production method of the hydrophobic organic solvent dispersed sol in which the hydrophobic organic solvent has a solubility of water of 0.05 to 12% by mass containing the silane treated modified metal oxide colloidal particle according to claim 8, the production method comprising processes (a), (b), (c), (d), (e), (f), and (g) below:

a process (a): preparing an aqueous solution containing an alkali stannate and an alkali silicate in such amounts that the mass ratio of silicon dioxide/stannic oxide becomes 0.1 to 5; removing cations existing in the aqueous solution to prepare an aqueous sol of a silicon dioxide-stannic oxide complex colloidal particle having a primary particle diameter of 1 to 4 nm; and adding to the aqueous sol, an amine compound in such an amount that the molar ratio of $M/(SnO_2+SiO_2)$, wherein, M is an amine compound, becomes 0.1 to 1.0 to obtain an aqueous sol of a silicon dioxide-stannic oxide complex oxide colloidal particle (B') having a mass ratio of silicon dioxide/stannic oxide of 0.1 to 5.0, having a primary particle diameter of 1 to 4 nm, and stabilized by an amine compound existing in a molar ratio of $M/(SnO_2+SiO_2)$, wherein M is an amine compound, of 0.1 to 1.0;

a process (b): mixing an aqueous sol of the colloidal particle (A) of an oxide of at least one metal selected from the group consisting of Ti, Fe, Zr, Sn, Ta, Nb, Y, Mo, W, Pb, In, Bi, and Sr having a primary particle diameter of 5 to 60 nm and the aqueous sol obtained in the process (a) in such amounts that the mass ratio (B')/(A) of the silicon dioxide-stannic oxide complex oxide colloidal particle (B') relative to the metal oxide colloidal particle (A) becomes 0.05 to 0.50 to obtain an aqueous sol of a modified metal oxide colloidal particle (C') produced by coating the metal oxide colloidal particle (A) with the silicon dioxide-stannic oxide complex oxide colloidal particle (B');

a process (c): cation-exchanging the aqueous sol of the modified metal oxide colloidal particle (C') obtained in the process (b) to remove the amine compound added in the process (a);

a process (d): adding to the aqueous sol obtained in the process (c), an amine compound in such an amount that $M/(SnO_2+SiO_2)$, wherein M is an mine compound, as the molar ratio of the amine compound relative to the silicon dioxide-stannic oxide complex oxide colloidal particle (B') becomes 0.001 to 0.08 to obtain an aqueous sol of the modified metal oxide colloidal particle (C) produced by coating an outer surface of the oxide colloidal particle (A) as the core with the silicon dioxide-stannic oxide complex oxide colloidal particle (B) having a primary particle diameter of 1 to 4 nm, in which the mass ratio of silicon dioxide/stannic oxide is 0.1 to 5.0, and an amine compound is bonded in a molar ratio of $M/(SnO_2+SiO_2)$, wherein M is an mine compound, of 0.001 to 0.08, the modified metal oxide colloidal particle (C) having the mass ratio (B)/(A) of the silicon dioxide-stannic oxide complex oxide colloidal particle (B) relative to the metal oxide colloidal particle (A) being 0.05 to 0.50;

a process (e): exchanging a dispersion medium of the aqueous sol obtained in the process (d) for a hydrophilic organic solvent;

a process (f): adding to the hydrophilic organic solvent dispersed sol obtained in the process (e), at least one of compound selected from the group consisting of an organic silicon compound of General Formula (II) below:

$$Si(R^1)_a(X)_{4-a} \qquad \text{General Formula (II)}$$

wherein $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group;

X is a hydroxy group or a $C_{1-4}$ alkoxy group; and a is an integer of 0 to 3, a hydrolysis product thereof, and an organic silicon compound of General Formula (III) below:

$$(R^1_3Si)_2NH \qquad \text{General Formula (III)}$$

wherein, $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group, so that the mass ratio of the organic silicon compound relative to the modified metal oxide colloidal particle (C) becomes 0.01 to 0.50 to bond a silyl group of General Formula (I):

$$-Si(R^1)_a(X)_{3-a} \qquad \text{General Formula (I)}$$

wherein, $R^1$ is a $C_{1-12}$ substituted or unsubstituted alkyl group or halogenated alkyl group, a $C_{2-12}$ substituted or unsubstituted alkenyl group, a $C_{6-12}$ substituted or unsubstituted aryl group or halogenated aryl group, an epoxy group, an acryloyl group, a methacryloyl group, a methacryloxyalkyl group, a mercapto group, an amino group, or a cyano group;

X is a hydroxy group or a $C_{1-4}$ alkoxy group; and a is an integer of 0 to 3, to the surface of the modified metal oxide colloidal particle (C); and a process (g): exchanging a dispersion medium of the hydrophilic solvent dispersed sol obtained in the process (f) for a hydrophobic organic solvent having a solubility of water of 0.05 to 12% by mass.

13. The production method of the hydrophobic organic solvent dispersed sol according to claim 12, wherein at least one selected from the group consisting of methyl alcohol, ethyl alcohol, isopropyl alcohol, dimethylformamide, ethylcellosolve, butylcellosolve, ethylene glycol, and propylene glycol monomethyl ether is used as the hydrophilic organic solvent, and at least one of methyl ethyl ketone, methyl isobutyl ketone, cyclohexanone, hexane, ethyl acetate, butyl acetate, methyl methacrylate, diisopropyl ether, and toluene is used as the hydrophobic organic solvent having a solubility of water of 0.05 to 12% by mass.

14. A polymerizable organic compound composition comprising the silane treated modified metal oxide colloidal particle according to claim 1 and a polymerizable organic compound.

15. The polymerizable organic compound composition according to claim 14, wherein the polymerizable organic compound is a cationic-polymerizable resin.

16. The polymerizable organic compound composition according to claim 14, wherein the polymerizable organic compound is a liquid polymerizable epoxy resin.

17. The polymerizable organic compound composition according to claim 14, wherein the polymerizable organic compound is a polymerizable epoxy resin having in the molecule thereof, one or more epoxy cyclohexyl group(s).

18. The polymerizable organic compound composition according to claim 14, wherein the polymerizable organic compound is both of, or any one of, an acrylic monomer and an acrylic oligomer.

19. A fine powder comprising the silane treated modified metal oxide colloidal particle according to any one of claim 1 and having an average particle diameter of 0.1 to 100 μm.

* * * * *